(12) United States Patent
Mitsuyasu et al.

(10) Patent No.: US 9,751,157 B2
(45) Date of Patent: Sep. 5, 2017

(54) PROCESS FOR IDENTIFYING EXISTENCE OF PARTIALLY WELDED SPOTS AND RETENTION OF CUT-OUT PART IN WIRE-CUT ELECTRICAL DISCHARGE MACHINING

(71) Applicant: SEIBU ELECTRIC & MACHINERY CO., LTD., Fukuoka-ken (JP)

(72) Inventors: Takashi Mitsuyasu, Fukuoka-ken (JP); Masatoshi Kawano, Fukuoka-ken (JP)

(73) Assignee: SEIBU ELECTRIC & MACHINERY CO., LTD., Fukuoka-ken (JP)

( * ) Notice: Subject to any disclaimer, the term of this patent is extended or adjusted under 35 U.S.C. 154(b) by 864 days.

(21) Appl. No.: 14/241,206

(22) PCT Filed: Mar. 28, 2013

(86) PCT No.: PCT/JP2013/059256
§ 371 (c)(1),
(2) Date: Feb. 26, 2014

(87) PCT Pub. No.: WO2013/157373
PCT Pub. Date: Oct. 24, 2013

(65) Prior Publication Data
US 2014/0203000 A1    Jul. 24, 2014

(30) Foreign Application Priority Data

Apr. 18, 2012 (JP) ................................. 2012-094408

(51) Int. Cl.
*B23H 7/02* (2006.01)
*B23K 28/02* (2014.01)
(Continued)

(52) U.S. Cl.
CPC ............... *B23K 28/02* (2013.01); *B23H 7/04* (2013.01); *B23H 7/38* (2013.01); *B23K 9/0956* (2013.01); *B23H 7/20* (2013.01); *B23H 7/26* (2013.01)

(58) Field of Classification Search
CPC ... B23H 7/04; B23H 7/06; B23H 7/02; B23H 7/38; B23H 7/26; B23H 7/20; B23K 37/00; B23K 9/00; B23K 28/02; B23K 9/0956
(Continued)

(56) References Cited

U.S. PATENT DOCUMENTS 2,594,890 A * 4/1952 Ellwood .................. H01H 9/54
218/143
2,764,668 A * 9/1956 Dumoulin ............ B23K 9/0678
219/130.4
(Continued)

FOREIGN PATENT DOCUMENTS

EP 0534353 A1 3/1993
EP 2481510 A2 8/2012
(Continued)

OTHER PUBLICATIONS

European Search Report, dated Oct. 9, 2015. In corresponding application No. EP13777702.

*Primary Examiner* — Eric Stapleton
(74) *Attorney, Agent, or Firm* — Browdy and Neimark, PLLC

(57) ABSTRACT

A process for identifying existence of a welded spot on a cut-out part and retention of the cut-out part on a workpiece in a wire electrode is disclosed which makes it possible to go ahead process steps while identifying automatically the retention of the cut-out part on a workpiece, ensuring unmanned work of the wire electrode discharge processor. The process includes an inspection step to detect whether the (Continued)

wire electrode comes into contact with a welded spot while moving the wire electrode along the cutting path of kerf in the workpiece, after the wire electrode has come into contact with the welded spot, a step goes ahead to one of next procedures, and after the wire electrode has come into no contact with the welded spot, a step goes ahead to generate an alarm and the wire electrical discharge is ceased.

9 Claims, 11 Drawing Sheets

(51) Int. Cl.
  *B23H 7/04* (2006.01)
  *B23H 7/38* (2006.01)
  *B23K 9/095* (2006.01)
  *B23H 7/20* (2006.01)
  *B23H 7/26* (2006.01)
(58) Field of Classification Search
  USPC ............. 219/124.21, 124.34, 69.12, 69.17
  See application file for complete search history.

(56) References Cited

U.S. PATENT DOCUMENTS

| | | | | |
|---|---|---|---|---|
| 2,898,516 A * | 8/1959 | Volff | ............... | B23K 9/0673 219/130.4 |
| 3,322,929 A * | 5/1967 | Mayer | ............... | B23H 7/18 219/69.2 |
| 3,414,656 A * | 12/1968 | Luning | ............... | H05B 7/11 336/175 |
| 3,444,430 A * | 5/1969 | Needham | ............... | B23K 9/073 219/130.4 |
| 3,600,981 A * | 8/1971 | Wagner | ............... | B23H 1/04 219/69.15 |
| 3,614,694 A * | 10/1971 | Koontz | ............... | H01F 19/08 333/26 |
| 3,678,341 A * | 7/1972 | Constable | ............... | H02H 9/04 336/175 |
| 3,809,852 A * | 5/1974 | Weber | ............... | B23H 7/28 219/69.2 |
| 3,952,179 A * | 4/1976 | Baker | ............... | B23H 9/00 219/69.11 |
| 4,418,265 A * | 11/1983 | Tabata | ............... | B23K 9/0678 219/130.4 |
| 4,544,820 A * | 10/1985 | Johnson | ............... | B23H 9/12 219/69.15 |
| 4,618,760 A * | 10/1986 | Murch | ............... | B23K 9/0678 219/130.4 |
| 4,767,912 A * | 8/1988 | Eldridge | ............... | B23K 9/0673 219/130.4 |
| 4,820,894 A * | 4/1989 | Francois | ............... | B23H 11/00 204/206 |
| 5,242,555 A * | 9/1993 | Buhler | ............... | B23H 7/06 204/297.06 |
| 5,556,554 A * | 9/1996 | Morishita | ............... | B23H 7/02 219/69.12 |
| 5,629,842 A * | 5/1997 | Johnson | ............... | B03C 3/66 363/44 |
| 6,930,272 B1 * | 8/2005 | Limano | ............... | B23H 11/003 219/69.12 |
| 6,995,337 B2 * | 2/2006 | Blankenship | ............... | B23K 9/091 219/130.1 |
| 7,728,248 B1 * | 6/2010 | Wild | ............... | B23H 7/02 219/69.17 |
| 8,476,548 B2 * | 7/2013 | Mitsuyasu | ............... | B23H 7/04 219/69.12 |
| 2007/0205184 A1 * | 9/2007 | Mazumder | ............... | B23H 9/00 219/69.17 |
| 2008/0203069 A1 * | 8/2008 | Kao | ............... | B23H 1/02 219/69.17 |
| 2012/0193326 A1 * | 8/2012 | Mitsuyasu | ............... | B23H 7/04 219/69.17 |

FOREIGN PATENT DOCUMENTS

| | | |
|---|---|---|
| JP | 62218024 A | 9/1987 |
| JP | 3366509 B2 | 11/2002 |
| JP | 4480822 B2 | 3/2010 |
| JP | 2012-166332 A | 9/2012 |

\* cited by examiner

FIG. 7
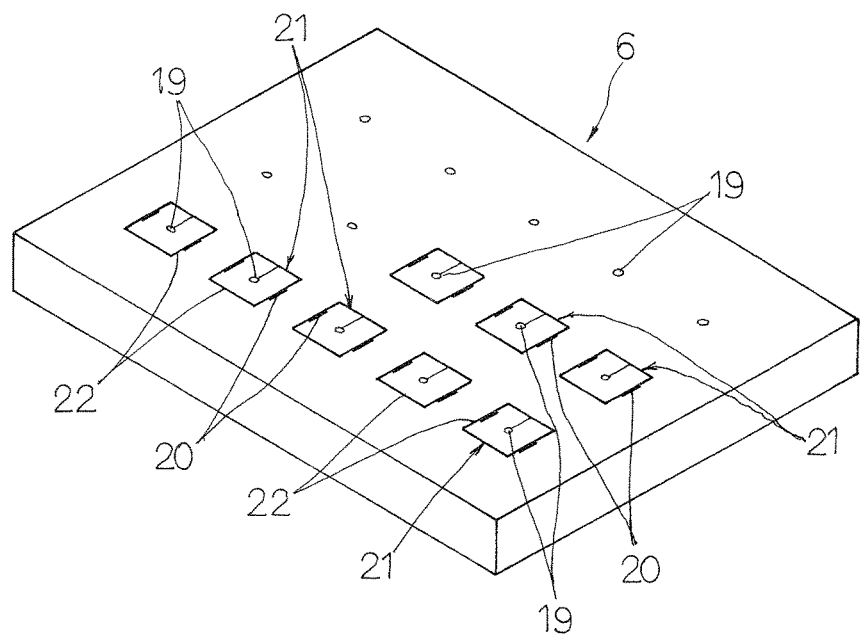
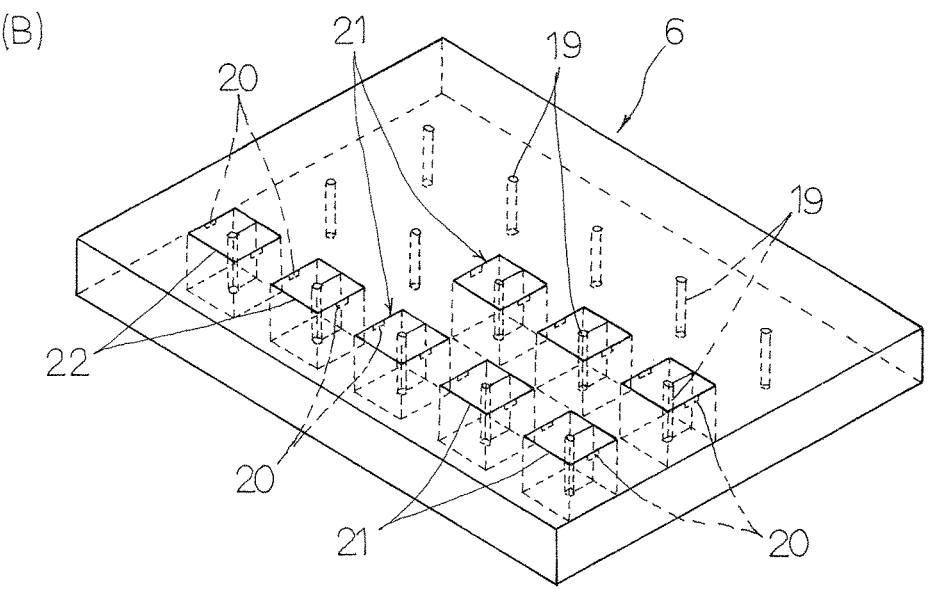

PROCESS FOR IDENTIFYING EXISTENCE OF PARTIALLY WELDED SPOTS AND RETENTION OF CUT-OUT PART IN WIRE-CUT ELECTRICAL DISCHARGE MACHINING

FIELD OF THE INVENTION

The present invention relates generally to a wire electrical discharge machining in which a part or product to be cut out from workpiece of strips, plates or sheets is temporarily or tentatively retained on the workpiece with making partially welded spots integral with the workpiece to keep the machined parts or products against falling away from the workpiece, and, more particularly, this invention relates to a process for identifying existence of a welded spot on a cut-out part and retention of the cut-out part on a workpiece in a wire electrical discharge.

BACKGROUND OF THE INVENTION

Conventionally, the wire-cut electrical discharge processors are sometimes used in gouging of dies. On spark discharging of workpiece in the wire-cut electrical discharge processors, the die plate processing is at times carried out in which a start hole is provided on the side of workpiece ordinarily called core. With the die plate processing, the wire-cut electrical discharging is completed through working steps including rough processing, semi-finishing, finishing, final finishing and so on. At the phase just before the end of a first process, hereinafter referred as first process, corresponding to the rough processing in every working step, the spark discharging comes to a halt to leave any uncut spot between the part and workpiece to keep the cut-out part or product against falling away from the workpiece. After the spark discharging has continued on the uncut spot, the part or product is separated from the workpiece to drop under its own weight. Even if the wire-cut electrical discharge processor is energized while the part or product is in the possibility of falling away or drop from the workpiece, there is a serious fear of damaging any of the wire-cut electrical discharge processor itself, part or product, and workpiece. Thus, it will be understood that the fear as stated earlier has to be sidestepped. Because of this, the spark discharging in the prior die plate process is temporarily withheld so as not to completely separate or cut out the part from the workpiece, and the workers break manually the uncut spots later on to separate the part from the workpiece, thereby ending the first process.

A conventional wire-cut electrical discharge machining process is disclosed in, for example patent literature 1, referred later, in which the first machining phase and the second cut-off phase are both carried out with only one processing program. With the prior wire-cut electrical discharge machining process, a cutting pathway program, uncut amount and reversing or receding amount to cut off every male pattern are set and input. The first machining phase comes to rest with leaving the uncut amount and stores the spot. In the second machining phase to cut off the uncut amount, the wire electrode after having gotten back from the stored spot along the cutting path or kerf by the programmed uncut amount makes automatic connection and resumes the electrical-discharge at the site to cut off the male pattern.

In another patent literature 2, referred later, which is a commonly-assigned senior application, the immersion wire electrical discharge machining processor is disclosed in which the buoyancy member supports the part or product cut out from the workpiece to prevent the short-circuit which would be otherwise occur between the cut-out part and the wire electrode, thereby supporting a heavy part in safety. The buoyancy member less in specific gravity than processing liquid is underneath the workpiece. The buoyancy developed in the buoyancy member owing to the processing liquid floats the parts cut out from the workpiece by the wire electrode so as not to sink in the processing liquid.

PRIOR ART LITERATURES

Patent Literatures

Patent literature 1: Japanese patent No. 3,366,509
Patent literature 2: Japanese patent No. 4,480,822

SUMMARY OF THE INVENTION

Subject to be Solved by this Invention

On the prior electrical discharge process to produce the part of preselected shape, however, the part has to be cut out with leaving uncut spots to keep the part against falling apart from the workpiece or scrap. Thus, the prior electrical discharge process has need of an additional step to isolate the part apart from the workpiece later on and an additional device for recovery of the products of workpiece. This means that the prior electrical discharge process takes a great deal of time to isolate the part such as a core from the workpiece, lowering in the rate of operation. To overcome the shortcoming as stated just earlier, looking at the electrical discharge phenomenon of a qualitatively long interval which causes a breakdown between the metal electrodes lying in a gaseous insulator, it was found that the breakdown starts with a corona discharge phase, then going through a spark discharge phase and an arc discharge phase in sequence, and ends in the breakdown. Thus, it has been developed to control voltage-current characteristics so as to conduct the discharge process at the spark discharge and the arc welding or plasma welding at the arc discharge or plasma discharge. Based on the consideration of the discharge phases as stated just above, the technical concept is motivated in which the wire electrode is used for the electrical discharge process or spark discharge to cut out the part from the workpiece and for arc welding to make a coalescence of the part with the workpiece at a preselected spot to retain temporarily the part on the workpiece.

The commonly-assigned senior Japanese Laid-Open Patent Application No. 2012-166 332 discloses the technical concept as stated just earlier in which the wire electrode is used for spark discharge to cut out the part from the workpiece and for arc welding to make a coalescence of the part with the workpiece to retain temporarily the part on the workpiece.

Meanwhile, with the method of producing the cut-out part or core with making partially welded spots integral with the workpiece in a cutting path or kerf of a predetermined contour in the arc welding phase of the wire electrical discharge process, the part or core is normally kept on the workpiece without apart from the workpiece even after the part has been cut out all around by the spark discharge process. When the coalescence of the part with the workpiece is failure or poor, the welded spot is apt to be broken easily under the external force caused by for example processing liquid. Even if the wire-cut electrical discharge processor is actuated without noticing the fact that the part or product has separated from the workpiece, there would be a serious problem of suffering any damage on any of the wire-cut electrical discharge processor itself, part or product, and workpiece.

In order to avoid any possibilities of introducing the problem as stated just earlier in the method of producing the part with making partially welded spots integral with the workpiece, it would be concern about continuous and smooth operation of the method of producing the part with making partially welded spots integral with the workpiece unless whether the part or product is securely held to the workpiece with tentative or temporary welded spots at preselected locations is somehow identified or confirmed. The awareness of the issue as stated just earlier has led to the development of a process for identifying existence of partially welded spots and retention of cut-out part to make sure of welded spots of the cut-out part with the workpiece.

The present invention, therefore, has as its primary object to overcome the problem as described above and to provide a process for identifying existence of partially welded spots and retention of cut-out part to make sure of welded spots of the cut-out part with the workpiece. According to the present invention, any of the wire-cut electrical discharge processor itself, part or product, and workpiece is protected against damages or injuries which might occur after the spark discharge has been curried out without becoming aware of breakage of the welded spots caused by any external impact of liquid flow and so on or failure in welding of the part to the workpiece. To this end, the present invention is envisaged inspecting whether the part or product is securely held to the workpiece at welded spots and actuating the wire-cut electrical discharge processor after identification of sure welding of the part to the workpiece to execute nest processing step such as spark discharging process. As opposed to the above, when the fact the part breaks away from the workpiece because of rupture of the welded spots are found or noticed, any warning sing or alarm is issued to cease the operation of wire electrical discharging process, preventing any damage which would otherwise occur on the wire electrical discharging processor, parts or workpiece, thereby making sure of safe operation of the wire electrical discharging processor to eliminate any dangerous conditions.

Means to Overcome the Subject

The present invention is concerned with a process for identifying existence of a welded spot on a cut-out part and retention of the cut-out part on a workpiece in a wire electrode discharge process comprising of the steps of, cutting a part to be separated from the workpiece with electrical discharge using spark energy generated by application of an inter-electrode voltage which occurs across a wire electrode and the workpiece lying in opposition to the wire electrode, changing an electrical processing condition applied across the wire electrode and the workpiece from a cutting phase to a welding phase at least one spot in a preselected cutting path or kerf of the part, fusing at least partially the wire electrode and welding the part with the workpiece at the spot in a preselected contour of the part, and further comprising of a rough cutting step in which the workpiece is rough cut to form the part in the cutting phase of the electrical processing condition with leaving the spot to be welded later, a welding step in which the electrical processing condition is switched over from the cutting phase to the welding phase to form a welded spot at the spot to be welded later thereby welding together the part with the workpiece, inspection step in which the electrical processing condition is changed to a positioning phase or a positioning power source in which the wire electrode is moved forward or backward to detect whether the wire electrode comes into contact with the welded spot without making contact with any of the part and the workpiece, and a step going ahead to one of next procedures to be executed on any of the part and workpiece in response to a state where the wire electrode comes into contact with the welded spot while the part is in safe retention on the workpiece or another next procedure to generate an alarm in response to another state where the wire electrode has no contact with the welded spot while the part is in no safe retention on the workpiece and the wire discharge is ceased.

Moreover, the next procedure on the workpiece stated just earlier comprises the step of, finish cutting carried out on a rough cut surface of any of the workpiece and the part, and welding the part with the workpiece at another spot lying in the preselected cutting path or kerf of the part, or rough cutting on the workpiece at another spot.

With the process for identifying existence of a welded spot on a cut-out part and retention of the cut-out part on a workpiece in a wire electrode discharge, the workpiece has a start hole for punching process anywhere other than an area of the part, and after the wire electrode threading through the start hole has carried out the rough cut executed on the workpiece, the wire electrode moves backward along the cutting path or kerf or goes back to a beginning location of the rough cutting and then the wire electrode carries out finish cutting on a rough cut surface of the part.

With the process for identifying existence of a welded spot on a cut-out part and retention of the cut-out part on a workpiece in a wire electrode discharge, the workpiece has a start hole for die plate process anywhere in the area of the part, and after the welding phase subsequent to the rough cutting on the workpiece, the electrical processing condition is switched to the cutting phase to make rough cutting on the workpiece over a preselected distance to separate the wire electrode from the welded spot, then the electrical processing condition is changed to the positioning phase or positioning power source to move backward the wire electrode along the rough cutting path or kerf and in doing so the inspection step is executed whether the wire electrode comes into contact with the welded spot, and in response to the state where the part is safe welded with the workpiece, the electrical processing condition is changed to the cutting phase to subsequently carry out the electrical discharge on the workpiece to cut another part, or in response to the state where the wire electrode has no contact with the welded spot, the electrical processing condition is changed to the welding phase to again carry out the welding process to weld the part with the workpiece at another spot in the cutting path or kerf of the part.

With the process for identifying existence of a welded spot on a cut-out part and retention of the cut-out part on a workpiece in a wire electrode discharge, moreover, after the rough cutting of the cutting path or kerf on the part is carried out more than the preselected cutting path or kerf of the part, the wire electrode stays for a preselected time at a location where the rough cutting has been carried out while the part is washed by a jet stream of processing liquid to remove any burr, chip or foreign matter which has occurred in the electrical discharge to eliminate any influence of the chip or foreign matter on the inspection step, and thereafter the wire electrode goes back along the cutting path or kerf to identify the contact with the welded spot.

With the process for identifying existence of a welded spot on a cut-out part and retention of the cut-out part on a workpiece in a wire electrode discharge, the retention of the part on the workpiece with the welded spot is identified when the wire electrode is allowed to thread the start hole or cutting path previously cut in the workpiece without making contact with the part and also the part is detected having no tilt relative to the workpiece. With the process for identifying existence of a welded spot on a cut-out part and retention of the cut-out part on a workpiece in a wire electrode discharge, as an alternative, in response to existence of the start hole previously cut in the workpiece, mechanical coordinates of the start hole are measured by the contact detection of the wire electrode with workpiece before and after the rough cutting of electrical discharge on the workpiece executed by the wire electrode, then central coordinates and sizes of the start hole are calculated based on the measured results, and the mechanical coordinates and calculated results of the start hole part are compared with each other to detect a variation in the mechanical coordinate to inspect the retention of the cut-out part on a workpiece in a wire electrode discharge.

With the process for identifying existence of a welded spot on a cut-out part and retention of the cut-out part on a workpiece in a wire electrode discharge, in response to existence of the start hole previously cut in the workpiece, diameters of the start hole at least three points are measured by the contact detection of the wire electrode with workpiece before and after the rough cutting of electrical discharge on the workpiece executed by the wire electrode and the mechanical coordinates of the start hole are calculated with a controller, and the diameters of the start hole are compared with each other to detect a variation in the mechanical coordinate to inspect the retention of the cut-out part on a workpiece in a wire electrode discharge. With the process for identifying existence of a welded spot on a cut-out part and retention of the cut-out part on a workpiece in a wire electrode discharge, moreover, the wire electrode is wired automatically at any desired location in the cutting path or kerf which has been cut in the workpiece, and a width across the cutting path or kerf is measured with using contact sensing of the wire electrode and compared with a gauge value prescribed in accordance with an electrical discharge condition of the wire electrode discharge processor, or a plurality of widths across the cutting path or kerf is measured and compared with each other a gauge value prescribed in accordance with an electrical discharge condition of the wire electrode discharge processor thereby to inspect the retention of the part on the workpiece with the welded spot. More especially, when there is no contact detection while tracing or following the previous finish cut path or kerf after the last welding step, it is determined that the cut-out part is separated from the workpiece along the cutting path or kerf and retained at the welded spot on the workpiece. This means identification of the width of the cutting path or kerf that has been cut in the workpiece. Identification of retention of the cut-out part on the workpiece has only to prove that the cut-out part is spaced away from the workpiece across a substantially constant width along the cutting path or kerf except for the welded spot. After the welding procedure has completed at all the welding spots on the cut-out part, the width across the cutting path of kerf is measured at desired spots and compared with the gauge value or each other to determine whether the cut-out part is lopsided.

Advantageous Effects of the Invention

With the process for identifying existence of a welded spot on a cut-out part and retention of the cut-out part on a workpiece in a wire electrode discharge, the start hole for the punching process on the workpiece is formed anywhere other than an area where the part of the cone and so on is cut out. The rough cut is carried out by the spark discharge along the cut path or kerf in workpiece with leaving a spot which will be welded later. Thereafter, the wire electrode goes back or returns along the rough cut path or kerf to the beginning point of the rough cutting while carrying out finish cut on the part. Last, the wire electrode welds the part with the workpiece at the spot which has been prepared earlier on. Then, the wire electrode is moved along the previously cut path or kerf to identify whether the wire electrode makes contact with the cut-out part or the workpiece. When the wire electrode has no contact with either of the part and the workpiece, it is identified or proved that the cut-out part is fixed or connected with the workpiece at only the welded spot. On the other, when the wire electrode has come into contact with the part or the workpiece, it is proved that the welded spot is insufficient or the part is separated from the workpiece. Thus, the alarm sound or sign is generated to cease the wire electrical discharge. In the die plate machining on the workpiece, the start hole is formed anywhere in an area where the part of the cone and so on is cut out. The rough cut is carried out by the spark discharge along the cut path or kerf in workpiece until reaching an area of a preselected distance which will be welded later. Thereafter, the electrical processing condition is changed to the welding phase to weld the part with the workpiece over the area of a preselected distance. Then, after the rough cutting is carried out over a preselected distance, the wire electrode goes back while detecting whether coming into contact with the welded spot, thereby identifying whether the welded spot is formed securely. In contrast, when the wire electrode has no contact with the edge of the welded spot, the wire electrode is moved back more than the distance of the welded spot. Nevertheless, even if the wire electrode doesn't come into contact with the welded spot, it is determined that there is formed no welded spot. Then, the electrical processing condition is changed to the welding phase to weld anew the cut-out part with the workpiece at a new location on the contour of the cut-out part. After the completion of the preselected rough cutting and the welding procedure, the step goes ahead to execute the finish cutting along the cut contour in the workpiece.

Moreover, the process for identifying existence of a welded spot on a cut-out part and retention of the cut-out part on a workpiece in a wire electrode according to the present invention makes it possible to go ahead to process steps while identifying automatically the retention of the cut-out part on a workpiece, ensuring unmanned work of the wire electrode discharge processor with saving the personnel and labor. In addition, the process for identifying existence of a welded spot on a cut-out part and retention of the cut-out part on a workpiece in a wire electrode according to the present invention improves operation rate of the wire electrode discharge processor, thereby making it possible to reduce the cost and to keep the delivery date, and further contributing to the industrial field by virtue of the effects as stated earlier.

BRIEF DESCRIPTION OF THE DRAWINGS

FIG. 3(A) is a wave form chart showing a voltage wave form and a current wave form in a routine machining phase in basic circuit of FIG. 2 and FIG. 3(B) is a wave form chart showing a voltage wave form and a current wave form in a welding phase in basic circuit of FIG. 2 to make a coalescent spot or a welded spot between the part and the workpiece.

FIG. 5(A) is a wave form chart showing a voltage wave form and a current wave form in an ordinary machining phase in the circuit of FIG. 4 and FIG. 5(B) is a wave form chart showing a voltage wave form and a current wave form in a welding phase in circuit of FIG. 4 to make a coalescent spot or a welded spot between the part and the workpiece.

FIG. 7 is a schematic diagram illustrating a geometric relation between the cut-out parts and the workpiece in a method of cutting the part with making welded spots in wire-cut electrical discharge machining: FIG. 7(A) shows the parts of rectangular shape cut out from the workpiece along a cutting line starting with a start hole and welded together with the workpiece at two spots and FIG. 7(B) is an exaggeratingly enlarged view in perspective showing the workpiece in which dotted lines depict cutting or machining tracks of the tool or the wire electrode in the electrical discharge machining process.

DETAILED DESCRIPTION OF THE PREFERRED EMBODIMENTS

Figure 1:
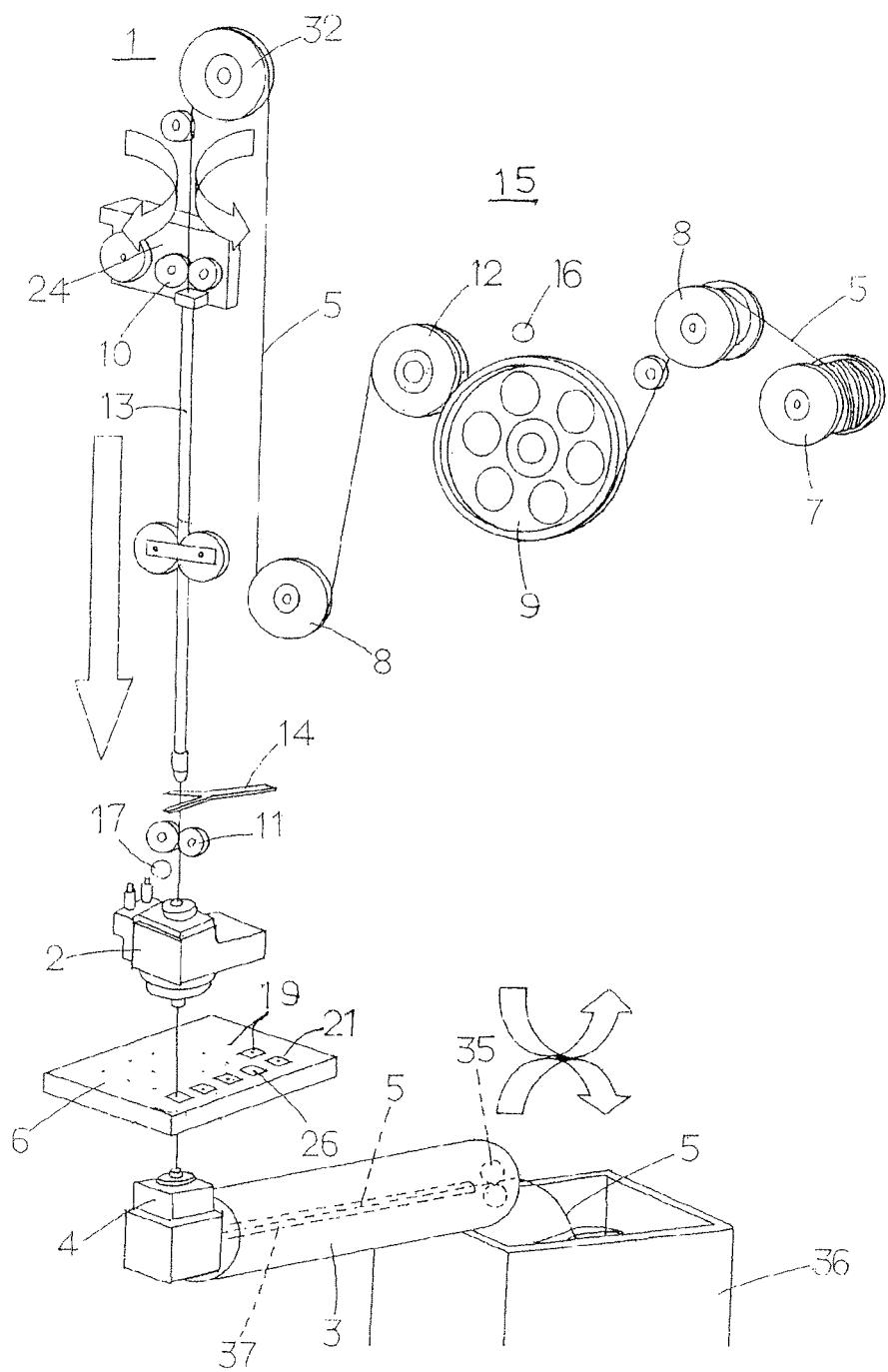
FIG. 1 is a schematic view illustrating a preferred embodiment of a wire electrical discharge processor operated according to a method of cutting out a part with making welded spots in wire-cut electrical discharge machining of the present invention.

A preferred embodiment of the wire electrical discharge processor to carry out the method of cutting the part with making welded spots in wire electrical discharge machining according to the present invention will be hereinafter described in detail with reference to FIG. 1. The wire-cut electrical discharge processor is generally composed of a source bobbin 7 mounted on a machine frame 15 and having wire electrode coils 5 wound around the bobbin 7, change-of-direction rollers 8 to control threading directions of the wire electrode 5 unwound out of the bobbin 7, a brake roller 9 to keep the delivery of the wire electrode better, a tension roller 12 to apply a tensile force to the delivered wire electrode 5 and a guide roller 32 to turn the wire electrode 5 towards a feeder tube 13. The wire electrode 5, after moving past the change-of-direction rollers 8 and the guide roller 32 in a wire-supply system, travels through a pair of wire-delivery rollers 10 serving as annealing rollers installed in a machine head 1, a feeder tube 13 suspended below a wire-electrode delivery unit 24 and a pair of common rollers 11 in order as stated above to stretch between the wire-delivery rollers 10 and the common rollers 11. Then, after the wire electrode 5 is firmly gripped by the wire-delivery rollers 10 and the common rollers 11, an electric current from a power source is applied to the wire electrode 5 through an electric feeder brush 18, see FIGS. 2 and 4, to flow through the wire-delivery rollers 10, wire electrode 5 and the common rollers 11, thereby annealing the wire electrode 5 extending between the wire-delivery rollers 10 and the common rollers 11 to remove stresses. An end of the wire electrode 5, not subjected to the heat-treatment of annealing, is cut off with a cutter 14 to be removed. Subsequently, as the feeder tube 13 suspended below a tube holder in the wire-electrode delivery unit 24 continues descending in response to the energization of the wire delivery rollers 10, the annealed wire electrode 5 is guided along the feeder tube 13 and threaded through an upper head 2. Moreover, the workpiece 6 to be subjected to the spark discharge process is secured by clamps 25 to a work table 23 lying in a processing bath, see FIGS. 12 and 13.

Between the annealing rollers 10 and the common rollers 11, there is provided the cutter 14 to cut off the end of the wire electrode 5 at the renewal of wire-end to render the wire electrode 5 preferable for threading, the breakage of the wire electrode 5, the execution of annealing process and so on. Moreover, there is installed a clamp, not shown, to dispose the waste wire-electrode 5 cut off by the cutter 14 which is actuated with a cutter unit to cut the wire electrode 5. Upon the resumption of threading after the breakage of the wire electrode 5, the wire-delivery rollers 10 rotate at a low velocity to advance the wire electrode 5 through the feeder tube 13 into the upper head 2. The wire electrode 5, after having advanced past the upper head 2, is threaded through a start hole, cutting path or kerf 19 in the workpiece 6 and then received in a lower head 4 lying below the workpiece 6 in opposition to the upper head 3. After the wire electrode 5 has been threaded past the lower head 4, the wire delivery rollers 10 was shifted to high-speed rotation to advance the wire electrode 5 out of the lower head 4. The wire electrode 5 pulled out of the lower head 4 is led in turn through a change-of-direction roller, a wire guide tube 37, a water separator located at an egress of the wire guide tube 37, all of which are installed inside the lower arm 3. Further, the wire electrode 5 is pulled out by winding rollers 35 lying downstream of the water separator and successively forced into a waste-wire hopper 36 by means of any suction means farther downstream of the winding rollers. An encoder 16 to detect the rpm of the brake roller 9 is installed on the brake roller 9 and a sensor 17 is installed on a lower supporter, not shown, of the machine head 1 to monitor any distortion, bending, threading conditions and so on caused in the wire electrode 5.

The workpiece 6 processed in the wire-cut electric discharge processor of the present invention is selected from, for example, iron series or carbide products. The wire electrode is metallic material including for example tungsten series, copper alloy series (brass family), piano wires and so on. As an alternative, a composite material may be used in which the metallic material as stated earlier is used as a core member and clad with other metallic member. For example, the core member made of material other than copper alloy family is clad with copper alloy family. In contrast, the core member made of copper alloy family is clad with zinc family and so on. With the embodiment discussed now, the workpiece 6 is made in a flat sheet or plate as shown in FIG. 7. The wire electrode 5, after threaded through any of the start holes 19 and cutting paths or kerfs, is supplied with an electric current via the electrical feeder brush 18 and a potential difference is applied across the wire electrode 5 and the workpiece 6 to carry out the electrical-discharge machining of the workpiece, thereby the cut-out part or product 26 is produced. In the threading phase in which the wire electrode 5 is introduced successively through the upper head 2, start hole or kerf cut in the workpiece 6 and the lower head 4, the foremost edge of the wire electrode 5 sometimes comes into abutment or collision against any one of the member as stated just earlier, failing to thread through across all the members. When the wire electrode 5 gets buckled, warped or bent because of the abutment of the wire electrode 5 against any of the members as stated just above, the distortion occurring in the wire electrode 5 is detected with sensor 17. More especially, the potential difference is applied across the wire delivery rollers 10 and an upper end of a guide-tube holder or the sensor 17. Thus, when the wire electrode 5 comes into contact with the sensor 17, the distortion in the wire electrode 5 is detected with sensor 17. The wire electrode 5 is applied with potential difference under such condition that the wire-delivery rollers 10 are fed with electricity while the wire-delivery rollers 10 are closed each other to grip the wire electrode 5 between them.

Thus, the abutment or collision of the wire electrode 5 applied with potential difference can be detected with the sensor 17.

A method of cutting out a part from a workpiece with making welded spots in wire-cut electrical discharge machining according to the present invention, although aimed at cutting out the part 26 along the desired contour 21 from the workpiece 6, is especially features the steps of fusing partially the wire electrode 5 in the cutting path or kerf to make fused area on the wire electrode 5 to weld the cut-out part 26 with the workpiece 6 to keep temporarily the cut-out part 26 in the workpiece 6. The fused area in the wire electrode 5 is limited to only a wire periphery over a predetermined length of the wire electrode 5 to make certain that the wire electrode 5 is fed continuously without interruption even after the wire electrode 5 has been partially fused to weld together the cut-out part 26 with the workpiece 6. In the method of cutting the workpiece with making welded spots of the present invention, the wire electrode 5 containing copper alloy series is better for the welding of the cut-out part 26 with the workpiece 6. According to the method of cutting out the part from the workpiece with making welded spots, the wire-delivery rollers 10 mounted on the machine head 1 pinch between them the wire electrode 5 unwound from the source bobbin 7 installed on the machine frame 15. As the wire-delivery rollers 10 is driven, the wire electrode 5 is threaded through the feeder tube 13, upper head 2, workpiece 6 set below the upper head 3 and the lower head 4 lying just below the workpiece 6 in opposed alignment with the upper head 3. The wire electrode 5 is further pulled out by the winding rollers 35 to run through the guide unit lying below the lower head 4 into the waste-wire hopper 5. With method of cutting out the part from the workpiece while making a welded spot to connect the part with the workpiece, more especially, the electrical processing condition to apply the potential difference across the wire electrode 5 and the workpiece 6 is switched from the cutting or machining phase to the welding phase at more than one spot, for example two spots in the embodiment discussed here, in the cutting path or kerf 21 to define a predetermined contour of the workpiece 26. In the welding phase of the electrical processing condition, the wire electrode 5 is fused partially to provide welded spots 20 at preselected locations in the cutting path 21, where the workpiece 26 is welded together with the workpiece 6 to be held in the workpiece 6 so as not to fall apart from the workpiece 6. As the welded spots 20 between the workpiece 26 and the workpiece 6 as shown in FIG. 7 are placed diametrically opposite with each other, the part 26 is kept in well-balanced posture inside the workpiece 6. With the method of cutting out the part from the workpiece with making welded spots of the present invention, moreover, the wire electrode 5 can break in the welding phase where the wire electrode 5 is fused to weld together the cut-out part 26 and the workpiece 6. Upon breakage of the wire electrode 5, the wire electrode 5 is newly resupplied into cutting path or kerf 22 at the breakage spot to continue welding of the workpiece 26 with the workpiece 6. As an alternative, the electrical-discharge machining or cutting may be followed by means of the newly resupplied wire electrode 5. The cut-out part 26, according to circumstances, is either of the products and the scraps.

Figure 3:
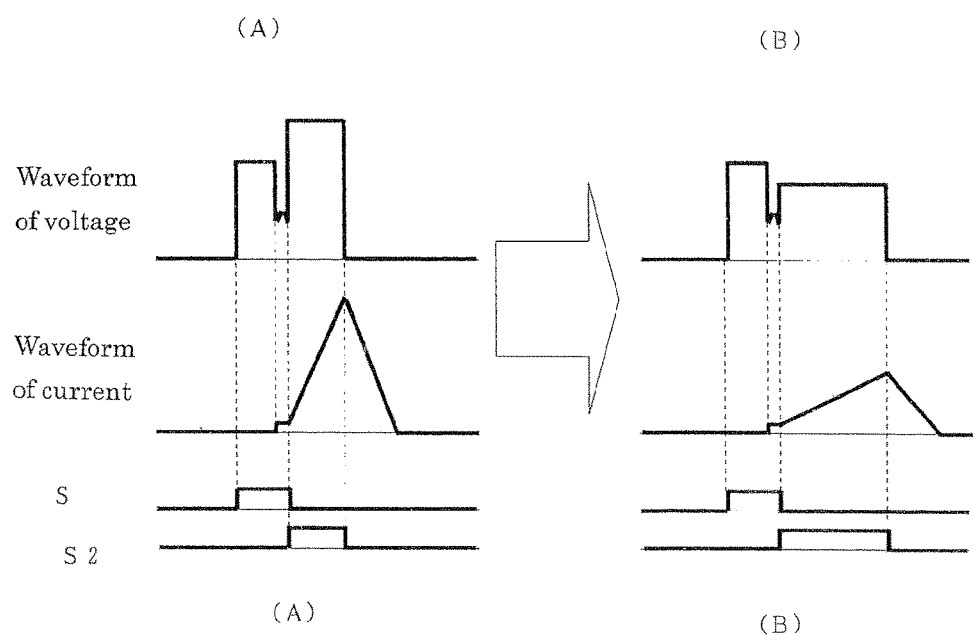
FIG. 3 is a wave form chart illustrating a voltage wave form at the upper and a current wave form at the lower on on/off control of switches S1 and S2 in the circuit of FIG. 2.
Figure 5:
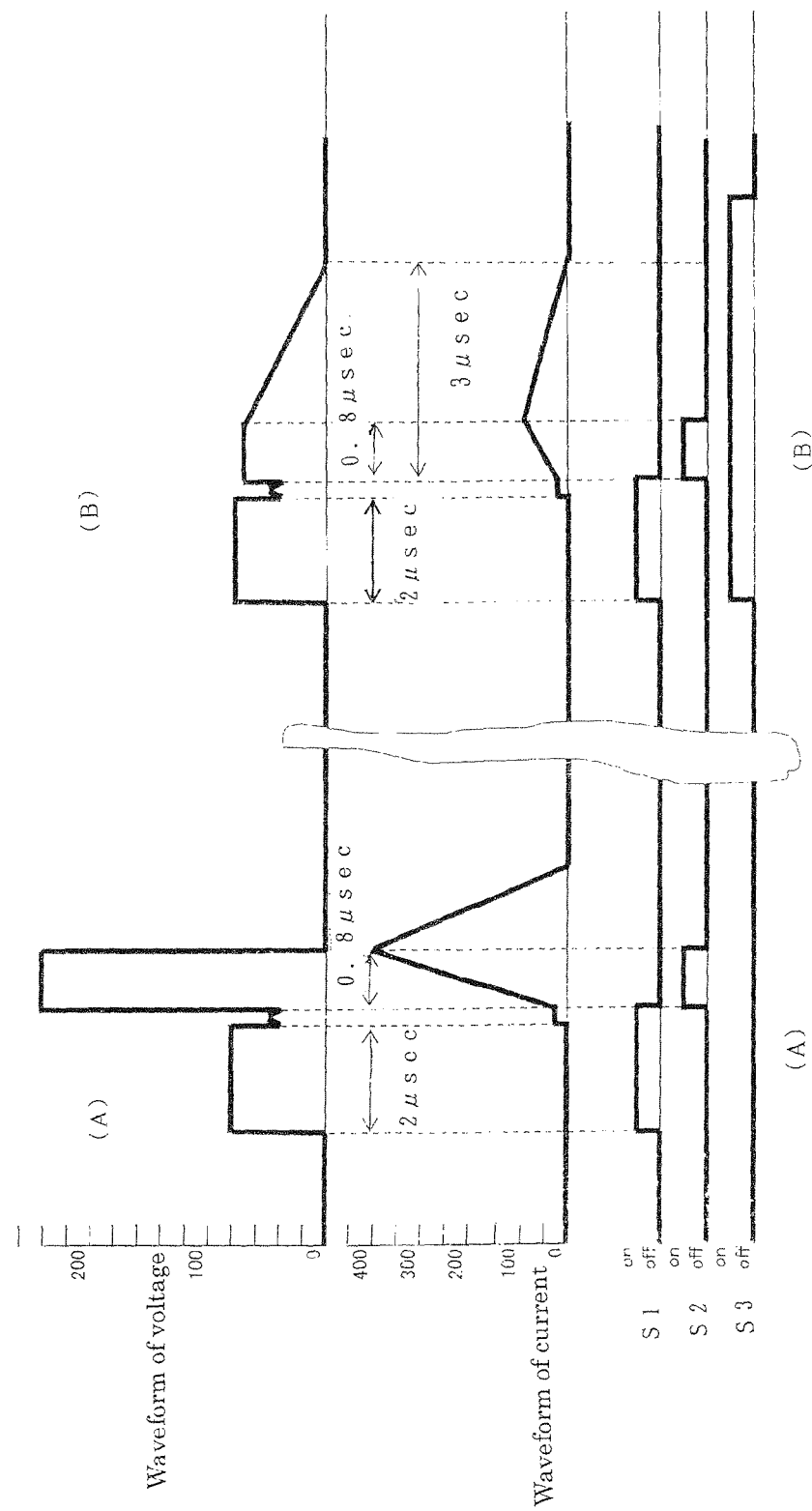
FIG. 5 is a wave form chart illustrating a voltage wave form at the upper and a current wave form at the lower on on/off control of switches S1, S2 and S3 in the circuit of FIG. 4.
Figure 8:
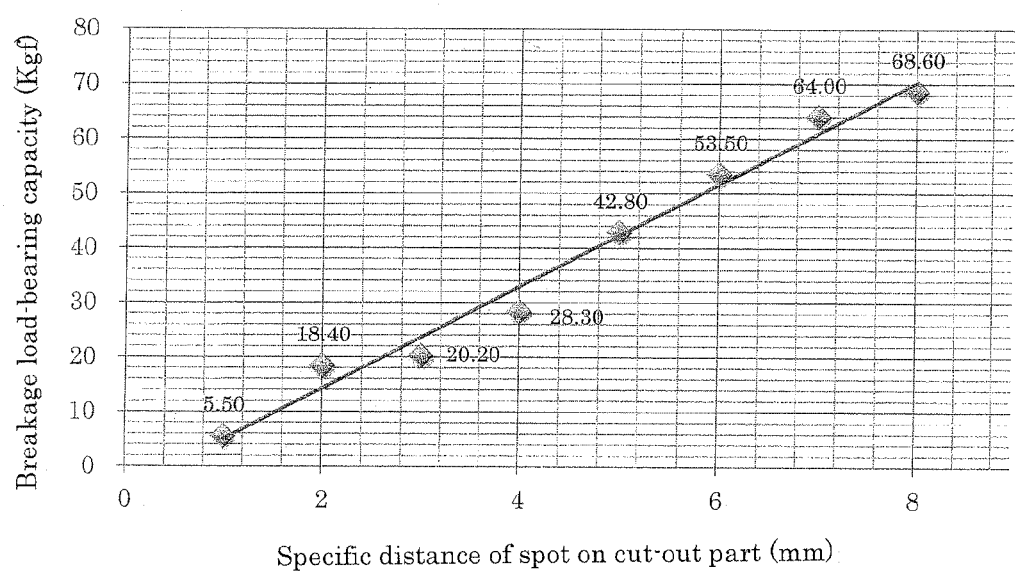
FIG. 8 is a graphic representation showing the result of withstand load tests to break the welded spots made between the cut-out part and the workpiece.

On switching of the electrical processing condition from the cutting phase to the welding phase in the method of cutting out the part from the workpiece while making the welded spot, a current flow (A) into the wire electrode 5, as seen in FIGS. 3 and 5, is controlled in such a way that a peak current flowing from a high-voltage load HV into the wire electrode 5 is decreased down to, for example about a quarter compared with the current in the wire electrical discharge machining to cut the workpiece 6, and a potential difference (V) applied across the wire electrode 5 and the workpiece 6 is reduced to, for example about a quarter compared with the voltage in the wire electrical discharge machining to cut the workpiece 6. Moreover, a pulse of the current flow into the wire electrode 5 is varied to, for example about a twice in pulse width. As a result, the electrical processing condition is shifted from the cutting phase to the welding phase in which the welded spot or coalescence 20 is produced between the cut-out part 26 and the workpiece 6 by an arc welding with the use of the wire electrode 5. With the electrical processing condition in the welding phase, the workpiece 6 is cut to produce the part 26 and at the same time the part 26 partially is weld together with the workpiece 6 to make the welded spot or the coalescence 20 along their opposite portions. The opposite portions here mean any edge portions of the workpiece 6 and the cut-out part 26 confronting each other across the cutting path of kerf 21. The welded spots with the wire electrode 5 are made offset or biased on the workpiece 6 towards either of one surface of the workpiece 6 closer to the upper head 2 and the opposite surface of the workpiece 6 closed to the lower head 4. Moreover, the welded spot 20 of the cut-out part 26 with the workpiece 6, because made on only the edge (only upper side in FIG. 7), can be easily broken with a bit of impact. After completion of the electrical discharge machining, the welded spots 20 are broken with weak external impact. Thus, the application of external impact on the part 26 causes breakage of the welded spots 20, making it easier to cut off the part 26 apart from the workpiece 6. Referring to FIG. 7, there is shown the workpiece 6 having cut-out parts of 8 square millimeters therein. The breakage load-bearing capacity on the welded spots 20 of the cut-out part 26 with the workpiece 6 was as shown in FIG. 8. The experimental data in FIG. 8 was conducted using the workpiece 6 which had the parts of 8 square millimeters therein. The welded spots 20 on opposite sides of the square of the cut-out parts 26 were 2 millimeters in length. The specified distance (mm) of the welded spot 20 is plotted on the abscissa while the breakage load-bearing capacity (Kgf) is on the ordinate.

The basic principle of the method of cutting the workpiece with making welded spots in the wire electrode discharge machining according to the present invention will be described later with reference to FIGS. 2 and 3.

Figure 2:
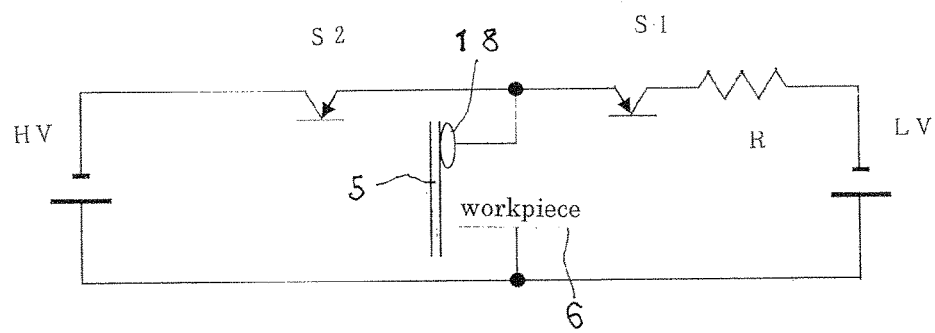
FIG. 2 is a circuit diagram to show a basic circuitry to carry out the method of cutting out a part with making welded spots in wire electrical discharge machining.

An electric circuitry shown in FIG. 2 has a first circuit in which an inter-electrode space between the wire electrode 5 and the workpiece 6 is connected in series with a first switch S1 and a low-voltage load LV combined with a resistance R to confirm the inter-electrode state between the charged electrodes, and a second circuit in which the space between the wire electrode 5 and the workpiece 6 is connected in series with a second switch S2 and a high-voltage load HV for the electric discharge processing, and the first and second circuits being connected in parallel with each other. The first circuit is provided to mainly confirm the state of the inter-electrode space between the wire electrode 5 and the material 6.

More especially, the first circuit is a detector to determine whether the wire electrode 5 is kept at a correct geometric relation with the workpiece 6 to carry out the electrical-discharge processing. The function of the resistance R is to adjust the amount of electricity flowing through the first circuit. The switch S1 is on/off controlled in time for in advance to the electrical-discharge machining of the workpiece 6. In contrast, the second circuit is provided for the discharge processing or machining and has no resistance therein because of ensuring a large amount of electricity at discharge machining of the workpiece 6. Next, the cutting or machining phase and the welding phase in the method of cutting the workpiece with making welded spots in the wire electrode discharge machining according to the present invention will be explained in detail later.

In the routine or ordinary cutting or machining phase shown in FIG. 3(A), after the first switch S1 has been turned on to generate a pulse, a matter of 80V of the low-voltage load LV is created across the inter-electrode space between the wire electrode 5 and the workpiece 6 for about 2 µsec to confirm whether the wire electrode 5 is kept at a correct geometric relation with the workpiece 6. When the inter-electrode relation is in adequate condition, the discharge occurs across the space between two charged electrodes. Subsequently, the first switch S1 is turned off and the second switch S2 is turned on to generate a pulse to get a current of, for example a matter of 400 V flowing for about 0.8 µsec to the wire electrode 5 and about 240 V of the high-voltage load HV is impressed across the inter-electrode space between the wire electrode 5 and the workpiece 6 to machine or cut the workpiece 6 by electrical discharge.

In the welding phase shown in FIG. 3(B) to make a coalescence or a welded spot between the cut-out part 26 and the workpiece 6, after the first switch S1 has been turned on to generate a pulse, about 80V of the low-voltage load LV is created across the inter-electrode space between the wire electrode 5 and the workpiece 6 for about 2 µsec to confirm whether the wire electrode 5 is kept at a correct geometric relation with the workpiece 6. When the inter-electrode relation is in adequate condition, the discharge occurs across the space between two charged electrodes. Then, the first switch S1 is turned off and the second switch S2 is turned on to generate a pulse to get a current of, for example, a matter of 110V flowing for about 3 µsec to the wire electrode 5, and about 70V or a quarter the voltage in the cutting phase of the high-voltage load HV is applied across the inter-electrode space between the wire electrode 5 and the workpiece 6 to generate an arc discharge to fuse the wire electrode 5, producing coalescence to weld together the workpiece 26 and the workpiece 6.

Figure 4:
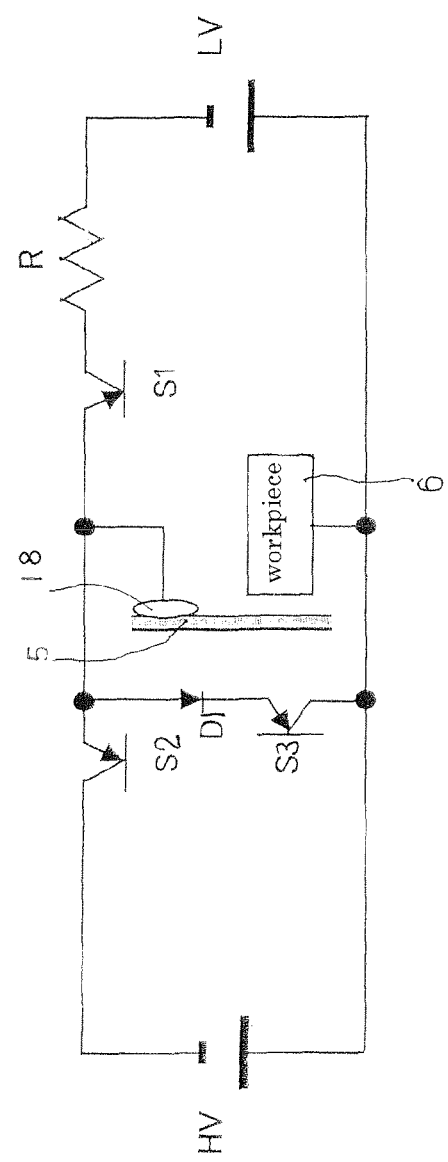
FIG. 4 is a schematic wiring diagram explaining an embodiment of the principle of the method of cutting out a part with making the welded spots in wire electrical discharge machining according to the present invention.

Moreover, the concrete embodiments in the method of cutting out the part from the workpiece with making welded spots in the wire electrode discharge machining according to the present invention will be described with reference to FIGS. 4 and 5. The basic circuitry to accomplish the method of cutting out the part from the workpiece with making welded spots in the wire electrode discharge machining according to the present invention is composed of a first circuit in which an inter-electrode space between the wire electrode 5 and the workpiece 6 is connected in series with a low-voltage load LV combined with a resistance R to confirm an inter-electrode state between charged electrodes and a first switch S1, a second circuit in which the space between the wire electrode 5 and the workpiece 6 is connected in series with a high-voltage load HV for the electric discharge cutting and a second switch S2, a third circuit in which the space between the wire electrode 5 and the workpiece 6 is connected in series with a first diode D1 and a third switch S3, and the first, second and third circuits being connected in parallel with each other. With the circuitry constructed as stated just earlier, phase-change from the cutting phase to the welding phase is executed by on/off control of the switches S1, S2 and S3. Especially in FIG. 5, the quantitative figures regarding first switch S1, second switch S2 and third switch S3 should be considered to be only illustration for better understanding of this invention. Moreover, the voltage wave form (V) and the current wave form (A) themselves also should be considered to be by way of illustration only. Thus, it is to be noted that the duration of time to keep the first switch S1 "ON" is not settled in conformity with the discharge condition, but determined depending on the state between the wire electrode 5 and the workpiece 6, for example parameters varying according to the power source for discharge processing, quality of the wire electrode 5, diameter of the wire electrode 5, and quality, thickness and so on of the workpiece 6. The duration of time to keep the first switch S1 "ON", although normally a few µsec or tens of µsec, is represented as 2 µsec by way of illustration only in the following description of the machining or cutting phase and the welding phase. Next, the duration of time to keep the second switch S2 "ON", although determined in conformity with the cutting condition or parameter inputs, is represented as 0.8 µsec by way of illustration only in the following description of the cutting phase and welding phase. In FIG. 5(B), moreover, the current flow intervals of the current wave form and the time intervals of impressed voltage of the voltage wave form, although not determined with the cutting or machining condition and unsettled, is represented as 3 µsec by way of illustration only in the following description of the machining or cutting phase and the welding phase.

With the cutting phase to machine the workpiece 6 by the wire electrode 5 in wire-electrode discharge processor having the basic circuitry as stated earlier, the first switch S1 is turned on to energize the low-voltage load LV to apply a potential difference across the inter-electrode space between the wire electrode 5 and the workpiece 6. Then, the first switch S1 is turned off and the second switch S2 is turned on to energize the high-voltage load HV to execute the cutting phase. With the welding phase to weld together the cut-out workpiece 26 and the workpiece 6, the first switch S1 is turned on while the third switch S3 is kept turned on to energize the low-voltage load LV to apply a potential difference across the inter-electrode space between the wire electrode 5 and the workpiece 6. Then, the first switch S1 is turned off and the second switch S2 turns on to energize the high-voltage load HV and finally the second switch S2 is turned off to execute the welding phase. With the on/off control of the switches as stated earlier, the electrical processing condition is switched over from the voltage/ampere wave form of the cutting phase in which the wire electrode 5 cuts the workpiece 6 to another voltage/ampere wave form of the welding phase in which the cut-out part 26 is welded together with the workpiece 6. In the welding phase, although the second switch S2 is turned off after a lapse of a fixed interval of time, the third switch S3 remains "ON" and therefore a circulating current passing through the first diode D1 and the third switch S3 flows across the inter-electrode space between the workpiece 6 and the wire electrode 5 to generate an electric current long in pulse width. As a result, the spark condition turns into the arc discharge by which the wire electrode 5 makes the coalescence spot or the welded spot between the cut-out part 26 and the workpiece 6 to weld together the part 26 with the workpiece 6.

The cutting and the welding phases in the method of cutting the part with making welded spots, as being same in details with the cutting and the welding phases disclosed in the commonly-assigned Japanese Patent Appln. No. 2011-212 221 (Publication No. 2012-166, 332), will be explained in brief hereinafter.

One example of the cutting phase in the method of cutting out the part from the workpiece with making welded spots in the wire electrode discharge machining according to the present invention will be described later with reference to FIGS. 4 and 5(A).

In first step, the first switch S1 is turned on to energize the low-voltage load LV. After the lapse of time, for example about 2 µsec, the discharge occurs between the inter-electrode space between the wire electrode 5 and the workpiece 6.

In second step, after the second switch S2 has been turned on, the voltage drop triggers off the application of the high-voltage load HV and the electric current rises to cause the spark discharge in which the cutting or machining of the workpiece 6 by the wire electrode 5 is carried out.

In third step, the electrical-discharge machining time between the wire electrode 5 and the workpiece 6, though determined dependent on processing condition of the workpiece 6, is for example about 0.8 µsec.

In fourth step, after the first, second and third switches S1, S2 and S3 have been once turned off, the potential difference across the inter-electrode space between the wire electrode 5 and the workpiece 6 becomes lost in load, resulting in downtime. The cutting path or kerf 21 in the workpiece 6 is completed by the wire electrode 5 through repetition of the cycle of the steps as stated just above with the period of 125~2000 kHz.

Figure 6:
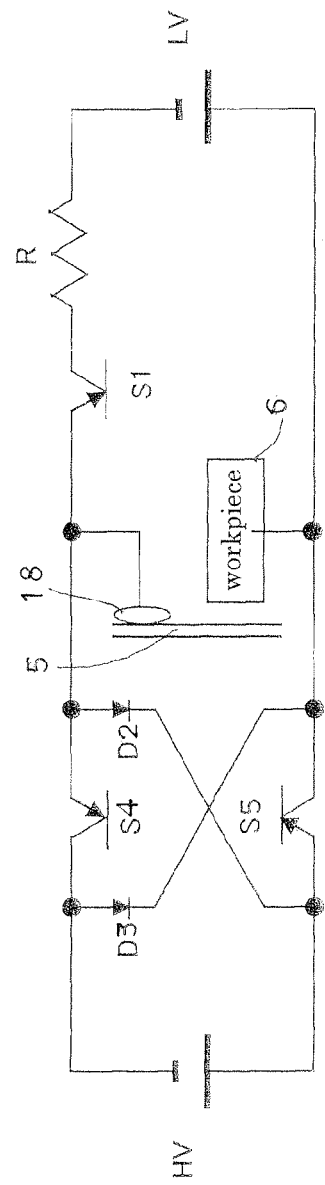
FIG. 6 is a schematic wiring diagram explaining an embodiment to carry out the method of cutting out the part with making the welded spots in wire electrical discharge machining according to the present invention.

Another example of the cutting phase in the method of cutting out the part from the workpiece with making welded spots in the wire electrode discharge machining according to the present invention will be described later with reference to FIG. 6.

In first step, the first switch S1 is turned ON to energize the low-voltage load LV. After the lapse of time, for example about 2 µsec, the discharge occurs between the inter-electrode space between the wire electrode 5 and the workpiece 6.

In second step, after the second switch S2 has been turned OFF and the fourth switch S4 and fifth switch S5 are turned ON, the voltage drop triggers off the application of the high-voltage load HV and the electric current rises to cause the spark discharge in which the cutting or machining of the workpiece 6 by the wire electrode 5 is carried out.

In third step, while the fourth switch S4 and the fifth switch S5 are kept at turned-ON state, the electrical-discharge machining time between the wire electrode 5 and the workpiece 6, though determined dependent on processing condition of the workpiece 6, is for example about 0.8 µsec.

In fourth step, after the fourth switch S4 has been turned OFF while the fifth switch S5 is kept at turned-ON state, the fifth switch S5 is turned ON for only sub-µsec to release the energized state of the high-voltage load HV to bring the current waveform closer to a trapezoid.

In fifth step, after the first, fourth and fifth switches S1, S4 and S5 have been once turned OFF, the potential difference across the inter-electrode space between the wire electrode 5 and the workpiece 6 becomes lost in load, resulting in downtime.

The cutting path or kerf 21 in the workpiece 6 is completed by the wire electrode 5 through repetition of the cycle of the steps as stated just above with the period of 125~2000 kHz.

One example of the welding phase in the method of cutting out the part from the workpiece with making welded spots in the wire electrode discharge machining according to the present invention will be explained later with reference to FIGS. 4 and 5(B).

In first step, the first switch S1 is turned ON to energize the low-voltage load LV. After the lapse of time, for example about 2 µsec, the discharge occurs between the inter-electrode space between the wire electrode 5 and the workpiece 6.

In second step, after the second switch S2 has been turned ON, the voltage drop triggers off the application of the high-voltage load HV and the electric current rises to cause the spark discharge in which the cutting or machining of the workpiece 6 by the wire electrode 5 is carried out.

In third step, upon change-over from the machining or cutting phase to the welding phase, the second switch S2 is turned OFF after the lapse of a fixed interval of time. However, the third switch S3 remains "ON" and, therefore, a circulating current flows across the inter-electrode space between the workpiece 6 and the wire electrode 5 to generate an electric current long in pulse width, when the wire electrode 5 fuses to produce coalescence or the welded spot between the cut-out workpiece or part 26 and the workpiece 6, thereby welding the cut-out part 26 with workpiece 6.

In fourth step, after the circulating current has been consumed completely, the third switch S3 is turned OFF, resulting in downtime.

Another example of the welding phase in the method of cutting out the part from the workpiece with making welded spots in the wire electrode discharge machining according to the present invention will be explained later with reference to FIG. 6.

In first step, the first switch S1 is turned on to energize the low-voltage load LV. After the lapse of time, for example about 2 μsec, the discharge occurs between the inter-electrode space between the wire electrode 5 and the workpiece 6.

In second step, after the fourth switch S4 and the fifth switch S5 have been turned on, the voltage drop triggers off the application of the high-voltage load HV and the electric current rises to cause the spark discharge in which the cutting or machining of the workpiece 6 by the wire electrode 5 is carried out.

In third step, the fourth and fifth switches S4 and S5 are kept at the "ON" state and the discharge occurs for the discharge time determined depending on the processing condition, for example a matter of 0.8 μsec.

In fourth step, the fourth switch S4 is turned OFF after the lapse of a fixed interval of time. However, the fifth switch S5 remains "ON" state and, therefore, a circulating current flows across the inter-electrode space between the workpiece 6 and the wire electrode 5 to release the energization of the high-voltage load HV to generate an electric current long in pulse width, when the arc is maintained between the workpiece 6 and the cut-out workpiece 26 to weld together them In fifth step, after the circulating current has been consumed completely, the fifth switch S5 turns OFF, resulting in downtime.

A specific number of the welded spots 20 between the workpiece 6 and the cut-out part 26 in the welding phase may be determined depending on the size of the part 26. A matter of overriding concern is that the cut-out part 26 is kept against separating or falling apart from the workpiece 6. Moreover, it doesn't matter slight tilt of the cut-out part 26 with respect to the workpiece 6. For instance, when the cut-out part 26 is of small in side and light in weight, it can be sustained or retained at only one on the workpiece 6. In contrast, if the cut-out part 26 is of large and heavy, the number of the welded spots 20 has to be selected to retain the cut-out part 26 in better balance on the workpiece 6.

The method of cutting out the part from the workpiece with making welded spots in the wire electrode discharge machining according to the present invention is adaptable to either of die operations the workpiece 6 is the desired part or product that remains after operation and the cut-out part 26 is the scrap, and punching or piercing operations the part 26 is the desired part or product that remains after operation, and the workpiece 6 produced is the scrap. In FIG. 7, holes 19 such as start holes are each made in the cut-out part 26 and therefore the part 26 is the scrap. As an alternative, when the part 26 is the desired part or product that remains after operation, the start hole 19 isn't made in the part 26, but in the workpiece 6 which is scrap.

A preferred embodiment of the electric circuitry to carry out the method of cutting out the part from the workpiece with making welded spots in the wire electrode discharge machining according to the present invention will be described later with reference to FIG. 6. Here, the voltage waveforms and the current waveforms occurring on the on/off control of the first, fourth and fifth switches S1, S4 and S5 in the electric circuitry of FIG. 6 are left out.

The embodied circuitry to accomplish the method of cutting out the part from the workpiece with making welded spots in the wire electrode discharge machining according to the present invention is composed of a first circuit in which an inter-electrode space between the wire electrode 5 and the workpiece 6 is connected in series with a low-voltage load LV combined with a resistance R to confirm an inter-electrode state between charged electrodes and a first switch S1, a second circuit in which the inter-electrode space between the wire electrode 5 and the workpiece 6 is connected in series with a high-voltage load HV for the electric discharge cutting, a fourth switch S4 and a fifth switch S5, a third circuit in which the inter-electrode space between the wire electrode 5 and the workpiece 6 is connected in series with a second diode D2 and a fifth switch S5, and a fourth circuit in which an inter-electrode space between the wire electrode 5 and the workpiece is connected in series with a third diode D3 and a fourth switch S4, and the first, second, third and fourth circuits being connected in parallel with each other. With the circuitry constructed as stated just earlier, when the fourth and fifth switches S4 and S5 are turned on, the inter-electrode space between the wire electrode 5 and the workpiece 6 is energized with the high-voltage load HV.

Change-over of the electrical processing condition from the machining or cutting phase to the welding phase in the electric circuitry constructed as stated earlier is executed with the ON/OFF control of the first, fourth and fifth switches S1, S4 and S5. After the fourth switch S4 has turned off under the condition the fifth switch S5 has been kept at "OFF" state, a first circulating current passing through the second diode D2 and the fifth switch S5 flows across the inter-electrode space between the wire electrode 5 and the workpiece 6. In contrast, after the fifth switch S5 has turned off under the condition the fourth switch S4 has been kept at "ON" state, a second circulating current passing through the third diode D3 and the fourth switch S4 flows across the inter-electrode space between the wire electrode 5 and the workpiece 6. In the electric circuitry discussed now, the first and second circulating currents are allowed to flow alternately with the on/off control of the first, fourth and fifth switches S1, S4 and S5. With the method of cutting out the part from the workpiece with making welded spots in the wire electrode discharge machining according to the present invention, as two circulating currents are generated by using the electric circuits having the diodes D2 and D3 therein, the waveform of the current for discharge machining nears trapezoidal shape. Thus, alternate occurrence of the two circulating currents makes it possible to alleviate or lessen a problem of generation of heat caused by switching action. With the method of cutting out the part with making welded spots, as the cut-out part 26 and the workpiece 6 are welded together by using the circulating currents, the waveform of the current can be lowered more slowly, compared with the discharge machining of the workpiece 6. Moreover, the on/off timing of the fourth and fifth switches S4 and S5 may be reversed each other.

Identification of the welded spots on the cut-out part and retention or connection of the cut-out part with the workpiece will be explained later regarding punching operation and die plate process in die manufacturing from the workpiece 6. The cutting phase and the welding phase in the method of cutting out the part with making the partially welded spots in the wire-cut discharge are shown in detail in the commonly-assigned JP publication No. 2012-166 332, the disclosure of which is incorporated herein by reference. As to identification of the welded spots on the cut-out part and retention or connection of the cut-out part with the workpiece, the punching operation and the die plate process are substantially same with each other in fundamental construction in which whether the cut-out part 26 is retained or connected with the workpiece 6 is identified or inspected by contact of the wire electrode 5 with the welded spot 20, but different from each other in steps executed for identification or inspection as explained later. In the punching operation in the wire discharge processor, the part 26 of preselected contour is cut out from the workpiece 6 and used as a blanking part for the product. The workpiece 6 has the start hole 19 other than the part 26. As alternatives, the start hole 19 is anew made is made anywhere other than the part 26 in the workpiece 6 or the start hole 19 is provided outside of the workpiece 6. In contrast with the above, in the die plate process in which the part 26 of the preselected contour is gouged out of the workpiece 6, the gouged-out part 26 is called the core which becomes disused article, whereas the residual workpiece 6 is used as the blanking part for the production. The start hole is made in the gouged-out part 26 called for the core or opened anew in the location of the gouged-out part 26.

Figure 9:
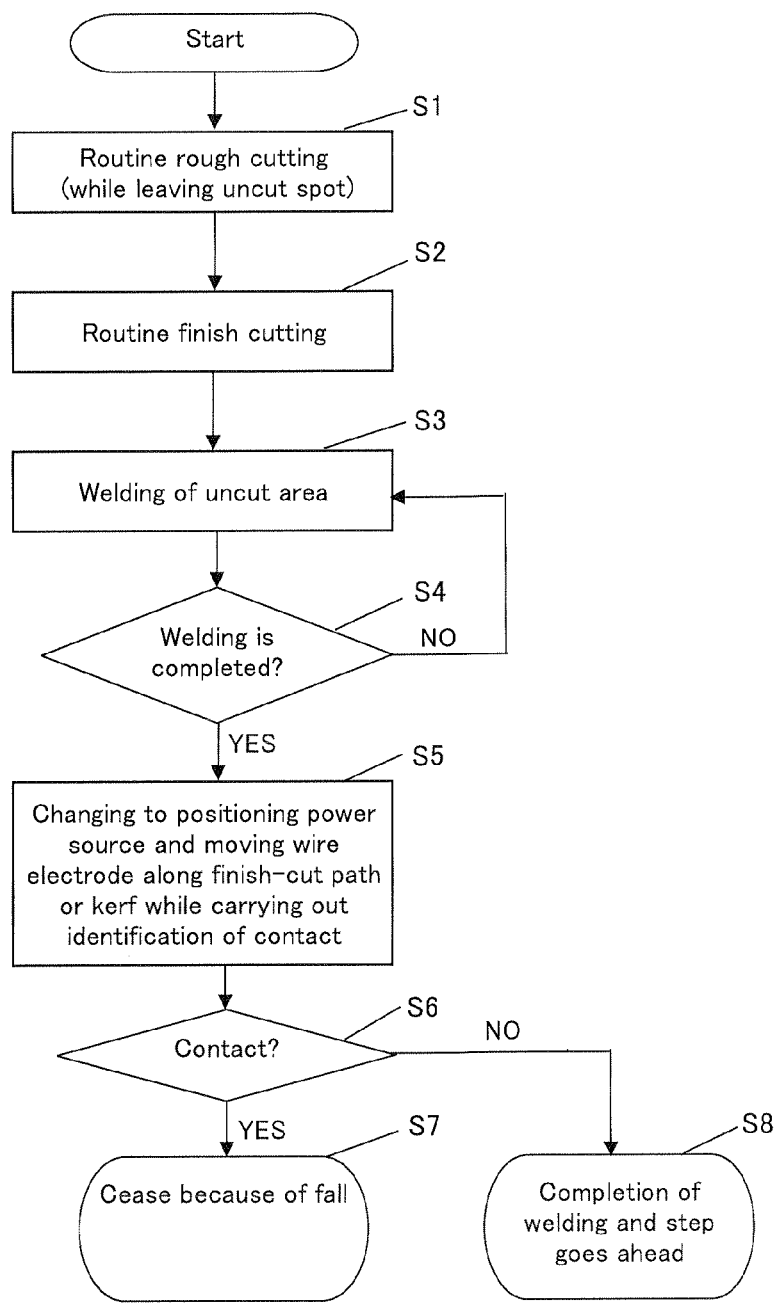
FIG. 9 is a flow diagram explanatory of a process for identifying existence of partially welded spots and retention of cut-out part in punching process to the workpiece in the wire-cut electrical discharge machining according to the present invention.

First, the following is the description with reference to the flowchart of FIG. 9 showing one embodiment of identification of the welded spots on the cut-out part and retention or connection of the cut-out part with the workpiece in the punching operation which is carried out on the workpiece 6 with the wire electric discharge machining. Punching process will be here described on the embodiment in which the welded spot 20 is formed at only one location in the last zone of the cutting path or kerf 21. Preparatory to beginning or starting spark discharge machining on the workpiece 6, the workpiece 6 is provided with a start hole 19 at a preselected location other than an area of the part 26 or drilled to make anew a start hole 19 anywhere other an area of the part 26. Then, the wire electrode 5 is threaded through the start hole 19 and energized with the processing potential applied across the wire electrode 5 and the workpiece 6. In step S1, a roughing cut with spark discharge is carried out on the workpiece 6 along the cutting path or kerf 21 with leaving the spot to be welded or fused later of a specific distance at only one location in the last zone of the cutting path or kerf 21. In step 2, after completion of the roughing cut along the cutting path or kerf 21 on the workpiece 6, the wire 5 is backed along the cutting path of the rough cut to start hole 19. Thereafter, a routine finishing cut is carried out along the rough-cut kerf. In step 3, after completion of the finishing cut on the workpiece 6, the wire electrode 5 is backed to the starting spot or is in the end of the finishing cut. At the state as stated just earlier, the spot to be welded or fused later still is untreated. Here, electrical processing condition applied across the wire electrode 5 and the workpiece 6 is changed or switched over from a cutting phase to a welding phase where the part 26 is welded to the workpiece 6 along cutting path or kerf over the spot to be welded or fused. In step 4, it is identified that whether the welding of the part 26 with the workpiece 6 is completed at the area of the spot 20 to be welded. In step 5, when the wire electrode 5 is short of the zone previously subjected to the finishing cut, the welding process is further continued. Then, after the wire electrode 5 has reached the zone previously subjected to the finishing cut, the welding phase is switched over to a positioning power source because the part 26 has been completely welded to workpiece 6. And, the wire electrode 5 is moved along the cutting path or kerf finish-cut in the workpiece 6.

In step 6, in case where the part 26 welded normally with the workpiece 6, there is a clearance in the finish-cut path or kerf and, therefore, the wire electrode 5 is allowed to move without touch or engagement with any of the part 26 and the workpiece 6. In contrast, when the wire electrode 5 comes into touch or engagement with any of the part 26 and the workpiece 6, the welding condition is incomplete and therefore there is a possibility of separation of the part 26 from the workpiece 6. Then, it is identified whether the wire electrode 5 is in contact or engagement with any one of the part 26 and the workpiece 6. In step 7, in case where the electrode 5 comes into touch or contact with any of the part 26 and the workpiece 6, the welding of the part 26 with the workpiece 6 is incomplete and therefore the part 26 is considered separated from the workpiece 6. An alarm is generated to stop the wire-discharge for inspection. In step 8, in contrast, when the wire electrode 5 has no contact with any one of the part 26 and the workpiece 6, the part 26 is considered well welded with the workpiece 6 and normally retained with the workpiece 6. Thus, the steps goes ahead to initiate the spark discharge for next cutting operation of other cutting path or kerf.

Figure 10:
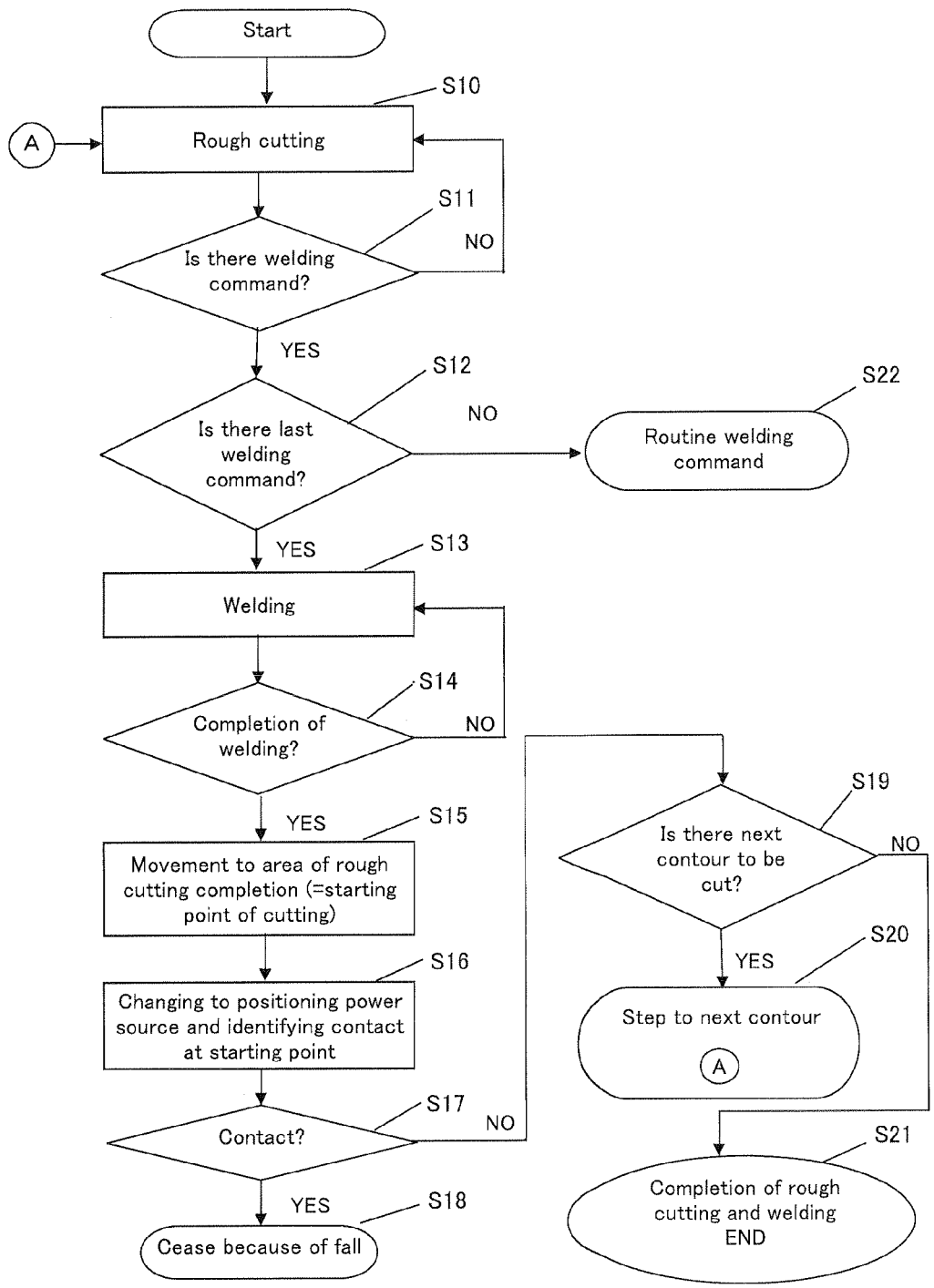
FIG. 10 is a flow diagram explanatory of a rough processing step and a final welding step in the identification of partially welded spots and retention of cut-out part in die plate process to the workpiece in the wire-cut electrical discharge machining according to the present invention.
Figure 11:
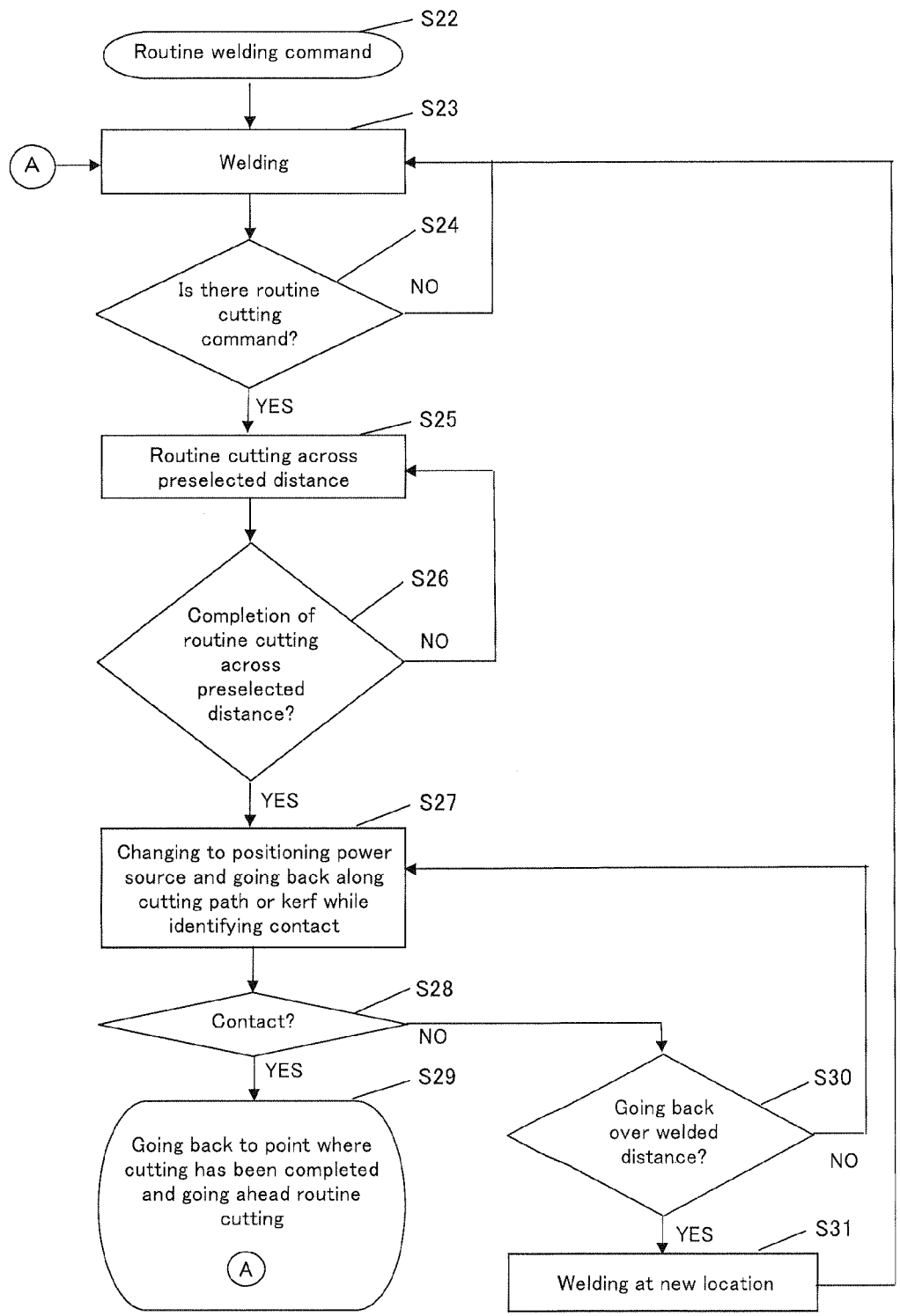
FIG. 11 is a flow diagram explanatory of a routine welding step in the identification of partially welded spots and retention of cut-out part in die plate process to the workpiece in the wire-cut electrical discharge machining according to the present invention.

Next, the following is the description with reference to the flowchart of FIGS. 10 and 11 showing one embodiment of identification of the welded spots on the cut-out part and retention or connection of the cut-out part with the workpiece in the die plate processing which is carried out on the workpiece 6 with the wire electric discharge machining. The die plate processing carried out on the workpiece 6 will be here described on the embodiment in which the welded spots 20 are formed at some locations of one spot in the last zone of the cutting path or kerf 21 and another spot in a zone which balances in weight with the one spot recited just above to support the part 26 on the workpiece 6 with safety. Preparatory to beginning or starting spark discharge machining on the workpiece 6, the workpiece 6 is provided with a start hole 19 at a preselected location in an area for the part 26 or drilled to make anew a start hole 19 in an area of the part 26. With the die plate processing, the start hole 19 is made in the part 26 of disused core or formed anew in the location for the disused core. Then, at least one of the workpiece 6 to be subjected to the wire-discharge is set in the wire-discharge processor and the wire electrode 5 is threaded through the start hole 19 and connected automatically at the start hole 19. Mechanical coordinate of the start hole 19 formed in the workpiece 6 is identified and the identified information is stored in a computerized controller. In die plate processing on the workpiece 6, a plurality of the parts 26 are mostly cut out from the workpiece 6. For beginning the routine rough cutting by the spark discharge on the workpiece 6, the wire-discharge process is energized to apply the processing potential across the wire electrode 5 and the workpiece 6. In step S10, a roughing cut with spark discharge is carried out along the cutting path or kerf 21 on the workpiece 6 until reaching the spot 20 to be welded or fused later. In step S11, after completion of the roughing cutting of spark discharge has reached a location of the spot 20 to be welded or fused later, the controller determine whether there is a welding command. In step S12, when there is no welding command, the routine cutting is continued. In contrast, when the welding command exists, the controller determines whether the welding command is the last welding command. In step S13, when the welding command is other than the last welding command, the step goes ahead to the routine welding command of step S22 described later. In contrast, when the welding command is last welding command, the part 26 is finally welded with the workpiece 6. In step S14, subsequently, the controller determined whether the last welding command is completely executed. When the welding process to connect the part 26 with the workpiece 6 is incomplete, the last welding process is continued. In step S15, after completion of the last welding process, a jet stream for the cutting process is lowered and the wire electrode 5 is moved to the location where the rough cutting has been completed or the welding has begun. In step S16, the wire electrode 5 is moved across an approach area of cutting path ranging from the beginning point of rough cutting to the start hole. In step S17, it is identified whether weather the wire electrode 5 in the moving route thereof makes contact with either of the part 26 or a wall around the start hole 19 in the part 26. In step S18, when the wire electrode 5 in the moving route thereof has made contact with either of the part 26 or a wall around the start hole 19 in the part 26, there is a possibility that the part 26 is isolated from the workpiece 6 and tilts with respect to the workpiece 6. Thus, sign or alarm to stop the operation occurs and the wire-discharge processor stops working. In step S19, when the wire electrode 5 in step 17 has no contact with either of the part 26 or a wall around the start hole 19 in the part 26, it is proved that the welded spot 20 is safely made to retain the part 26 with the workpiece 6 and therefore the wire electrode 6 is cut while whether subsequent cutting process is demanded on the workpiece 6 is identified or inspected. In step S20, when there is subsequent cutting process on the workpiece 6, the wire electrode 6 is moved to other start hole 19 to execute next cutting path or kerf. The processing on the workpiece 6 goes ahead the routine rough cutting in step 10 to make the die plate processing. In step 21, when there is no subsequent processing demand on the workpiece 6, the rough cutting and welding processes cease. Thereafter, the part or core 26 welded with the workpiece 6 is isolated from the workpiece 6 and then, finish process is done on the spark discharged surface of the workpiece 6.

In step S22, when there is no last welding command in step S12, the routine welding command is executed. In step S23, according to the routine welding command, the welding is continued to weld the part 26 with the workpiece 6. In step S24, after the welded spot 20 of a preselected length has been formed to connect the part 26 with the workpiece 6, it is determined whether the routine cutting command is or not. When there is no routine cutting command, the welding process is carried out to weld the part 26 with the workpiece 6. In step 25, after the welding has been completed, the routine cutting command is issued by which the wire electrode 5 is out of the welded spot 20. As a result, the routine rough cutting of is carried out over a preselected distance on the part 26 and then the wire electrode 5 is out of the welded spot 20. In step S26, it is determined whether the routine rough cutting is completed over the preselected distance. If the routine rough cutting is short of the preselected distance, the routine rough cutting is continued. In step S27, when the routine rough cutting is finished over the preselected distance, the power source of the wire discharge processor is changed to the positioning power source and the wire electrode 5 goes back along cutting path of kerf 21 of the part 26. In step 28, it is determined whether the wire electrode 5 comes into contact with the welded spot 20. In step 29, when the wire electrode 5 has made contact with the welded spot 20, it is considered that the part 26 is proved to be retained on the workpiece 6 with the welded spot 20 and therefore the wire electrode 5 is moved back to the location where the rough cutting has been completed. Then, the procedure goes ahead the routine rough cutting in step S10. In step S30, when it couldn't be identified whether the wire electrode 5 made contact with the welded spot 20, the wire electrode 5 goes backward over the welded distance between the part 26 and the workpiece 6. When the wire electrode 5 doesn't yet go backward over the welded distance, the wire electrode 5 is further moved to the welded spot 20. When contact of the wire electrode 5 with the welded spot 20 isn't identified despite of the movement of the wire electrode 5 more than the welded distance, the procedure goes ahead to step 31 to anew weld the part 26 with the workpiece 6. To this end, the procedure returns back to step 23 where the wire electrode 5 is advanced to other location in the cutting path or kerf 21 to weld the part 26 to the workpiece 6 there.

Detection of the welded spot and identification of the welded spot on the part and the retention of the part on the workpiece will be explained later with reference to FIGS. 12 and 13.

Figure 12:
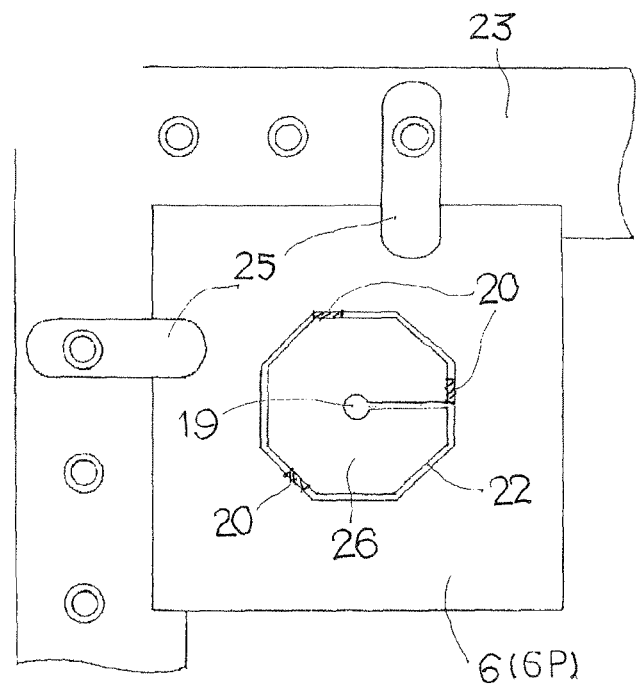
FIG. 12 is a view in plan showing a blanking workpiece set on a work table of the wire-cut electrical discharge processor to prepare an octagonal die plate in the die plate process according to the present invention.
Figure 13:
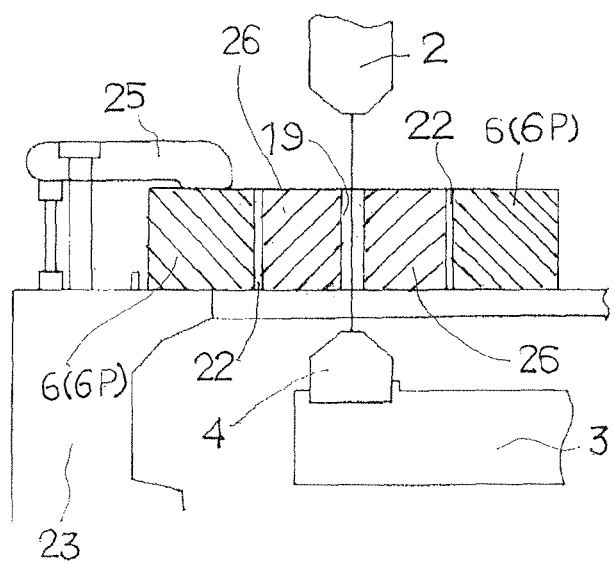
FIG. 13 is a view in side elevation, partially in transverse section, showing the workpiece of FIG. 12 set on the work table of the wire-cut electrical discharge processor.

In FIG. 12, there is shown a blanking workpiece 6 to produce an octagonal die plate 6P which is placed set and fastened with clamps 25 on a worktable 23 of a wire electrode discharge machine (WEDM). A start hole 19 has been bored through the workpiece 6 in advance of placement of the workpiece 6 on the worktable 23 of a wire electrode discharge machine. The procedures of the wire discharge machining are broadly categorized into rough cutting (viz., process to cut roughly a contour of a part), semi-finishing (viz., process to finish a profile of the contour), final finishing (viz., process to finish roughness on the part), and so on. Secure retention of the part 26 on the workpiece 6 with the welded spot 20 especially functions for the rough cutting process. With the die plate processing, the welded spot 20 avails to keep retaining or supporting the workpiece 6 or the core, which is to be disused after the completion of the rough cutting procedure, till the end of the rough cutting process. After the workpiece 6 is placed on the worktable 23, the wire electrode 5 is treaded through the start hole 19 and wired. On identification of the gap in place of the start hole 19, detection of the start hole 19 is carried out with the wire electrode 5 to determine whether the part 26, which will be finally called the core, is securely retained with the welded spot 20. Contact or engagement of the wire electrode 5 with the start hole 19 is detected in three directions except for an approach direction of the wire electrode 5. The mechanical coordinates of the contact inspected or detected as stated earlier is stored in a memory in the control unit or controller.

With the wire discharge machine, then, the part 26 is cut by spark discharge along the cutting path or kerf 21 which has been previously programmed in the computer. After having reached the spot 20 which has been programmed in the computer to be first welded, the processing condition is switched over from the cutting phase to the welding phase in accordance with the programmed processing condition to carry out the welding phase on the spot 20 to be welded. After completion of the welding phase on the spot 20, contact identification with the wire electrode 5 as stated earlier is carried out to inspect whether the part 6 of the die plate is securely connected with the workpiece 6 of the core by means of the welded spot 20. After, completion of the welding phase, the wire electrode 5 somewhat rough cuts the plate 26 with the welding phase along the programmed cut path to leave once the welded spot to thereby keep the identification of contact of the wire electrode 5 against getting worse which would otherwise occur due to any slag generated in the spark discharge. After rough cutting of the part 26 over a preselected length, the wire electrode discharge is switched over from the cutting phase to the inspection phase. Then, the wire electrode 5 goes back along the cutting path or kerf 22 which has been just before rough cut to go ahead to the welded spot 20 lying the cutting path or kerf 22. Thus, the welded spot 20, even if lying between the machined die plate 6P and the core, would be detected by the wire electrode 5 which has come into contact with the welded spot 20. When the welded spot 20 is detected, the wire electrode 5 after having gone back to the point where the inspection phase started continues machining process according to the program. In contrast, if no welded spot 20 is inspected, the welding phase and the inspection phase are carried out in near the end point of just before cutting phase. Moreover, the wire electrode 5 after having gone back to the point where the inspection phase started continues machining process according to the program. When no welded spot 20 is detected even though after preselected number of repetition of the welding and inspection phases, it is determined to be failure condition and therefore the procedure goes ahead to generate any alarm. While the cutting phase and the welding phase are repeated until reaching the last spot to be welded, the inspection phase is executed as the occasion demands.

The last welded spot on the part 6 is in near the end of the programmed cutting path or kerf. The wire electrode 5 goes back to the start hole 19 through the approach area of the cutting path after the detection of the last welded spot. When the wire electrode 5 is interfered with or makes contact with the cut-out part 26 on the way to the start hole 19, the cut-out part 26 is determined to be lopsided without safety retained. In this instance, the wire discharge machine is probably damaged when the cut-out part 26 has fallen away from the workpiece 6 and therefore any alarm is generated to stop the operation of the wire discharge machine. Moreover, after the wire electrode 5 has returned to the start hole 19, the mechanical coordinate of the start hole 19 is inspected with the same process as in the time prior to the beginning of the cutting phase. The start hole 19 gets out of place more than the prescribed value, the cut-out part 26 of the core might be lopsided and therefore any alarm is generated to stop the operation of the wire discharge machine. On the other hand, when the wire electrode 5 goes back to the start hole 19 while making no contact with either of the cut-out part 26 of the cone and the workpiece 6 of the die plate 6P and further no gap of the start hole 19 is detected even with the contact inspection of the wire electrode 5, the core is determined securely retained on the die plate at the welded spot 20. This means the programmed rough cutting has been completed. When the other rough cutting process is required on the workpiece 6, the wire electrode 5 is once broken and removed to another start hole 19 to repeat the procedure as stated just above. The core is detached from the workpiece 6 preparatory to the next cutting procedure after the completion of the rough cutting on the workpiece 6.

AVAILABILITY ON INDUSTRY

The process for identifying partially welded spots of the cut-out part and retention of the cut-out part in the wire-cut electrical discharge machining of the present invention is preferably befitted for the wire-cut electrical discharge processor.

DESCRIPTION OF REFERENCE SIGNS

1 Machine head
2 Upper head
4 Lower head
5 Wire electrode
6 Workpiece
7 Source bobbin
10 Wire-delivery roller
13 Feeder tube
15 Machine frame
20 Welded spot
21 Cut contour
22 Cutting path or kerf
26 Cut-out part
35 Winding rollers 35
D1 first Diode
D2 second Diode
D3 third Diode
HV High-voltage load
LV Low-voltage load
S1 first switch
S2 second switch
S3 third switch
S4 fourth switch
S5 fifth switch

What is claimed is:

1. A process for identifying existence of a welded spot on a cut-out part and retention of the cut-out part on a workpiece in a wire electrode discharge process comprising of the steps of, cutting a part to be separated from the workpiece with electrical discharge using spark energy generated by application of an inter-electrode voltage which occurs across a wire electrode and the workpiece lying in opposition to the wire electrode, changing an electrical processing condition applied across the wire electrode and the workpiece from a cutting phase to a welding phase at least one spot in a preselected cutting path or kerf of the part, fusing at least partially the wire electrode and welding the part with the workpiece at the spot in a preselected contour of the part, and further comprising of a rough cutting step in which the workpiece is rough cut to form the part in the cutting phase of the electrical processing condition with leaving the spot to be welded later, a welding step in which the electrical processing condition is switched over from the cutting phase to the welding phase to form a welded spot at the spot to be welded later thereby welding together the part with the workpiece, inspection step in which the electrical processing condition is changed to a positioning phase or a positioning power source in which the wire electrode is moved forward or backward to detect whether the wire electrode comes into contact with the welded spot without making contact with any of the part and the workpiece, and a step going ahead to one of next procedures to be executed on any of the part and workpiece in response to a state where the wire electrode comes into contact with the welded spot while the part is in safe retention on the workpiece or another next procedure to generate an alarm in response to another state where the wire electrode has no contact with the welded spot while the part is in no safe retention on the workpiece and the wire discharge is ceased.

2. A process for identifying existence of a welded spot on a cut-out part and retention of the cut-out part on a workpiece in a wire electrode discharge, as set forth in claim 1, wherein the next procedure on the workpiece comprises the step of, finish cutting carried out on a rough cut surface of any of the workpiece and the part, and welding the part with the workpiece at another spot lying in the preselected cutting path or kerf of the part, or rough cutting on the workpiece at another spot.

3. A process for identifying existence of a welded spot on a cut-out part and retention of the cut-out part on a workpiece in a wire electrode discharge, as set forth in claim 1, wherein the workpiece has a start hole for punching process anywhere other than an area of the part, and after the wire electrode threading through the start hole has carried out the rough cut executed on the workpiece, the wire electrode moves backward along the cutting path or kerf or goes back to a beginning location of the rough cutting and then the wire electrode carries out finish cutting on a rough cut surface of the part.

4. A process for identifying existence of a welded spot on a cut-out part and retention of the cut-out part on a workpiece in a wire electrode discharge, as set forth in claim 1, wherein the workpiece has a start hole for die plate process anywhere in the area of the part, and after the welding phase subsequent to the rough cutting on the workpiece, the electrical processing condition is switched to the cutting phase to make rough cutting on the workpiece over a preselected distance to separate the wire electrode from the welded spot, then the electrical processing condition is changed to the positioning phase or positioning power source to move backward the wire electrode along the rough cutting path or kerf and in doing so the inspection step is executed whether the wire electrode comes into contact with the welded spot, and in response to the state where the part is safe welded with the workpiece, the electrical processing condition is changed to the cutting phase to subsequently carry out the electrical discharge on the workpiece to cut another part, or in response to the state where the wire electrode has no contact with the welded spot, the electrical processing condition is changed to the welding phase to again carry out the welding process to weld the part with the workpiece at another spot in the cutting path or kerf of the part.

5. A process for identifying existence of a welded spot on a cut-out part and retention of the cut-out part on a workpiece in a wire electrode discharge, as set forth in claim 4, wherein after the rough cutting of the cutting path or kerf on the part is carried out more than the preselected cutting path or kerf of the part, the wire electrode stays for a preselected time at a location where the rough cutting has been carried out while the part is washed by a jet stream of processing liquid to remove any burr, chip or foreign matter which has occurred in the electrical discharge to eliminate any influence of the chip or foreign matter on the inspection step, and thereafter the wire electrode goes back along the cutting path or kerf to identify the contact with the welded spot.

6. A process for identifying existence of a welded spot on a cut-out part and retention of the cut-out part on a workpiece in a wire electrode discharge, as set forth in claim 1, wherein the retention of the part on the workpiece with the welded spot is identified when the wire electrode is allowed to thread the start hole or cutting path previously cut in the workpiece without making contact with the part and also the part is detected having no tilt relative to the workpiece.

7. A process for identifying existence of a welded spot on a cut-out part and retention of the cut-out part on a workpiece in a wire electrode discharge, as set forth in claim 1, wherein in response to existence of the start hole previously cut in the workpiece, mechanical coordinates of the start hole are measured by the contact detection of the wire electrode with workpiece before and after the rough cutting of electrical discharge on the workpiece executed by the wire electrode, and the mechanical coordinates of the start hole part are compared with each other to detect a variation in the mechanical coordinate to inspect the retention of the cut-out part on a workpiece in a wire electrode discharge.

8. A process for identifying existence of a welded spot on a cut-out part and retention of the cut-out part on a workpiece in a wire electrode discharge, as set forth in claim 7, wherein in response to existence of the start hole previously cut in the workpiece, diameters of the start hole at least three points are measured by the contact detection of the wire electrode with workpiece before and after the rough cutting of electrical discharge on the workpiece executed by the wire electrode, and the mechanical coordinates of the start hole are calculated with a controller, and the diameters of the start hole are compared with each other to detect a variation in the mechanical coordinate to inspect the retention of the cut-out part on a workpiece in a wire electrode discharge.

9. A process for identifying existence of a welded spot on a cut-out part and retention of the cut-out part on a workpiece in a wire electrode discharge, as set forth in claim 1, wherein the wire electrode is wired automatically at any desired location in the cutting path or kerf which has been cut in the workpiece, and a width across the cutting path or kerf is measured with using contact sensing of the wire electrode and compared with a gauge value prescribed in accordance with an electrical discharge condition of the wire electrode discharge processor, or a plurality of widths across the cutting path or kerf is measured and compared with each other a gauge value prescribed in accordance with an electrical discharge condition of the wire electrode discharge processor to thereby inspect the retention of the part on the workpiece with the welded spot.

\* \* \* \* \*